(12) United States Patent
Fujii

(10) Patent No.: US 10,048,953 B2
(45) Date of Patent: Aug. 14, 2018

(54) COMPILER PROGRAM, COMPILING METHOD, AND COMPILING DEVICE

(71) Applicant: FUJITSU LIMITED, Kawasaki-shi, Kanagawa (JP)

(72) Inventor: Yuya Fujii, Numazu (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/784,223

(22) Filed: Oct. 16, 2017

(65) Prior Publication Data

US 2018/0136917 A1 May 17, 2018

(30) Foreign Application Priority Data

Nov. 17, 2016 (JP) .................................. 2016-224501

(51) Int. Cl.
*G06F 8/41* (2018.01)
*G06F 9/455* (2018.01)
*G06F 9/38* (2018.01)

(52) U.S. Cl.
CPC .......... *G06F 8/4441* (2013.01); *G06F 8/4435* (2013.01); *G06F 8/456* (2013.01); *G06F 9/3887* (2013.01); *G06F 9/45516* (2013.01)

(58) Field of Classification Search
None
See application file for complete search history.

(56) References Cited

U.S. PATENT DOCUMENTS

| 9,378,000 | B1 * | 6/2016 | Lee | G06F 8/443 |
| 2003/0093780 | A1 * | 5/2003 | Freudenberger | G06F 8/443 |
| | | | | 717/153 |
| 2005/0060696 | A1 * | 3/2005 | Bicsak | G06F 8/433 |
| | | | | 717/156 |
| 2005/0183072 | A1 * | 8/2005 | Horning | G06F 21/14 |
| | | | | 717/140 |
| 2006/0005178 | A1 * | 1/2006 | Kilgard | G06F 8/443 |
| | | | | 717/153 |
| 2006/0212862 | A1 * | 9/2006 | Nesbitt | G06F 8/443 |
| | | | | 717/151 |
| 2008/0178149 | A1 * | 7/2008 | Peterson | G06F 8/437 |
| | | | | 717/110 |
| 2011/0119660 | A1 * | 5/2011 | Tanaka | G06F 8/4441 |
| | | | | 717/149 |

FOREIGN PATENT DOCUMENTS

| JP | H06-250988 | 9/1994 |
| JP | 2009-199520 | 9/2009 |

* cited by examiner

*Primary Examiner* — Isaac T Tecklu
(74) *Attorney, Agent, or Firm* — Fujitsu Patent Center

(57) ABSTRACT

A non-transitory computer-readable storage medium storing therein a compiler program for causing a computer to execute a procedure. The procedure includes copying a source program written in a parallel programming language to generate a plurality of optimization target programs corresponding to image numbers respectively; and repeatedly performing, for each of the optimization target programs, a first optimization that includes, substituting a function or a variable that indicates image number in the optimization target program with the image number, performing a constant propagation, deleting a conditional branch instruction having a condition under which a conditional statement is changed to a constant due to the constant propagation, and deleting a code that is not to be executed based on the conditional branch instruction.

14 Claims, 28 Drawing Sheets

FIG.2

S_PRG  EXAMPLE OF SOURCE LANGUAGE PROGRAM

```
1  type ty
2    integer, allocatable :: x(:)     ! DYNAMICALLY ALLOCATE TO VARIABLE x IN ONE DIMENSION
3  end type
4
5  type(ty) :: co(100)[*]             ! COARRAY co IS AN ARRAY OF SIZE 100
6
7  if (this_image() == 2) then        ! IF IMAGE NUMBER IS 2
8    do i=1,100
9      allocate(co(i)%x(8))           ! ALLOCATE SPACE OF SIZE 8 TO COMPONENT x OF EACH ELEMENT co(i) OF COARRAY co
10   end do
11 else                               ! IF IMAGE NUMBER IS OTHER THAN 2
12   do i=1,100
13     allocate(co(i)%x(10))          ! ALLOCATE SPACE OF SIZE 10 TO COMPONENT x OF EACH ELEMENT co(i) OF COARRAY co
14   end do
15 end if
16
17 do i=1,100
18   co(i)%x = 0                      ! ASSIGN VALUE 0 TO EACH ELEMENT OF COMPONENT x OF EACH ELEMENT co(i) OF
                                      !   COARRAY
19 end do
20
21 sync all                           ! SYNCHRONIZE ALL PROCESSES
22
23 if (this_image() /= 1) then        ! IF IMAGE NUMBER IS NOT 1
24   do i=1,100
25     co(i)%x = co[i][1]%x           ! COPY CONTENTS OF COMPONENT x OF COARRAY co OF PROCESS 1
                                      ! TO EACH COMPONENT x OF LOCAL ARRAY co
26   end do
27 end if
```

FIG.3 co(100)[*]

image_1, 3...n allocate(co(i)%x(10))

ARRAY co
co(1)   = x(1), x(2), ---- x(10)
co(2)   = x(1), x(2), ---- x(10)
----
co(100) = x(1), x(2), ---- x(10)

image_2 allocate(co(i)%x(8))

ARRAY co
co(1)   = x(1), x(2), ---- x(8)
co(2)   = x(1), x(2), ---- x(8)
----
co(100) = x(1), x(2), ---- x(8)

FIG.14

PROCESS 1

```
1  type ty
2    integer, allocatable :: x(:)
3  end type
4
5  type(ty) :: co(100)[*]
6
12 do i=1,100
13   allocate(co(i)%x(10))
14 end do
16
17 do i=1,100
18   co(i)%x = 0
19 end do
20
21 sync all
```

PROCESS 2

```
1  type ty
2    integer, allocatable :: x(:)
3  end type
4
5  type(ty) :: co(100)[*]
6
8  do i=1,100
9    allocate(co(i)%x(8))
10 end do
16
17 do i=1,100
18   co(i)%x = 0
19 end do
20
21 sync all
22
24 do i=1,100
25   co(i)%x = co(i)[1]%x
26 end do
```

PROCESS 3-n

```
1  type ty
2    integer, allocatable :: x(:)
3  end type
4
5  type(ty) :: co(100)[*]
6
12 do i=1,100
13   allocate(co(i)%x(10))
14 end do
16
17 do i=1,100
18   co(i)%x = 0
19 end do
20
21 sync all
22
24 do i=1,100
25   co(i)%x = co(i)[1]%x
26 end do
```

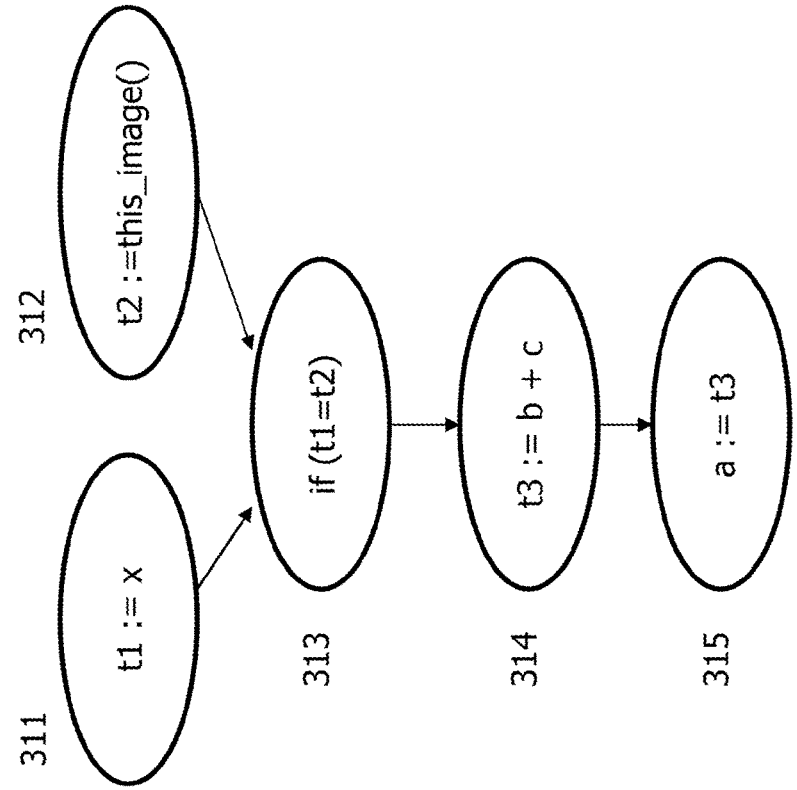

COMPILER PROGRAM, COMPILING METHOD, AND COMPILING DEVICE

CROSS-REFERENCE TO RELATED APPLICATION

This application is based upon and claims the benefit of priority of the prior Japanese Patent Application No. 2016-224501, filed on Nov. 17, 2016, the entire contents of which are incorporated herein by reference.

FIELD

The present invention relates to a compiler program, a compiling method, and a compiling device.

BACKGROUND

A program written in a parallel programming language (hereinafter, process-parallel program) is executed in parallel by a plurality of information processing devices (hereinafter, computers). Processes executed in parallel by a plurality of computers are herein referred to as process.

Some process-parallel programs are written in parallel programming languages that use partitioned global address space (PGAS) such as, for example, Fortran 2008 coarrays and Unified Parallel C (UPC). The program written in a parallel-programming language that uses PGAS is executed in parallel by a plurality of computers. The plurality of computers each have a processor (central processing unit: CPU), and a main memory, access to which is controlled by each processor. The plurality of main memories configures a global address space. This global address space is the distributed memory partitioned to each processor so as to be distributed memories.

During execution, the process-parallel program allocates to each process memory spaces having sizes that dynamically vary for each process. Each of processes can refer to the memory spaces of other processes. However, reference cost (e.g., access time) is higher when referring to the memory spaces of other processes than when referring the memory space of its own process. This is a general description of PGAS.

A compiler is described in Japanese Laid-open Patent Publication Nos. 2009-199520 and H06-250988.

SUMMARY

The effect of optimization by the compiler may sometimes be low in the process-parallel program executed in a plurality of processes described above as compared to serial execution programs. For example, arithmetic operations of variables and arrays to which memory sizes varying per process can be dynamically allocated is not suited to optimization by single instruction multiple data (SIMD) conversion or loop unloading. This is because the compiler generates a large number of comparison instructions (for determining whether or not the allocated size has been reached) in the SIMD conversion during optimization because it is necessary to deal with the number of iterations of arithmetic operations that varies for each process. For the same reason, the compiler generates a large number of comparison instructions during optimization in which loop unloading is performed. The effect of optimization is therefore reduced due to the overheads caused by the comparison instructions.

Moreover, when copying, between processes, variables and arrays to which memory sizes varying per process can be dynamically allocated, for example, the copy destination process inquires the copy source process the memory size. When the sizes of the copy source and copy destination are different, the copy destination process releases a memory space of the copy destination, and allocates a memory space of the same size as that of the copy source, before the copying. In this case, the effect of optimization is low because of high reference cost for checking sizes between processes.

Further, when performing constant propagation and deletion of branch instructions, for example, which are one type of ordinary optimization, the effect of optimization is low for the following reasons: Namely, the process numbers during execution of a process-parallel program are run-time constants that do not change during execution, and the process numbers of each process are determined during execution. However, optimization target programs need to be able to deal with a plurality of process numbers during compilation. Therefore, it is not possible to set process numbers as constants during compilation, so that constant propagation is not applicable.

In static compilation based on profiling results, for example, conditions of the conditional instructions associated with process numbers are determined differently or oppositely for each process, so that optimization such as deletion of branch instructions is difficult.

According to an aspect of the embodiments, a non-transitory computer-readable storage medium storing therein a compiler program for causing a computer to execute a procedure comprising: copying a source program written in a parallel programming language to generate a plurality of optimization target programs corresponding to a plurality of image numbers respectively, each of the plurality of image numbers including each number of processes that are executed in parallel when the source program is executed; and repeatedly performing, for each of the plurality of optimization target programs, a first optimization that includes, substituting a function or a variable that indicates one of the plurality of image numbers in the each of the plurality of optimization target programs with the one of the plurality of image numbers, performing a constant propagation in the each of the plurality of optimization target programs, deleting a conditional branch instruction having a condition under which a conditional statement is changed to a constant due to the constant propagation, and deleting a code that is not to be executed based on the conditional branch instruction.

According to the first aspect, the optimization effect of the process-parallel program is enhanced.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 2 is a diagram illustrating one example of a source program written in a parallel programming language that uses PGAS.

FIG. 3 is a diagram illustrating the coarray co(100)[*] of FIG. 2.

FIG. 14 is a diagram illustrating optimization target programs generated for images 1, 2, and 3 to n and subjected to the optimization step of FIG. 11.

FIG. 28 is a diagram that depicts an intermediate representation program example and its flowchart.

DESCRIPTION OF EMBODIMENTS

Figure 1:
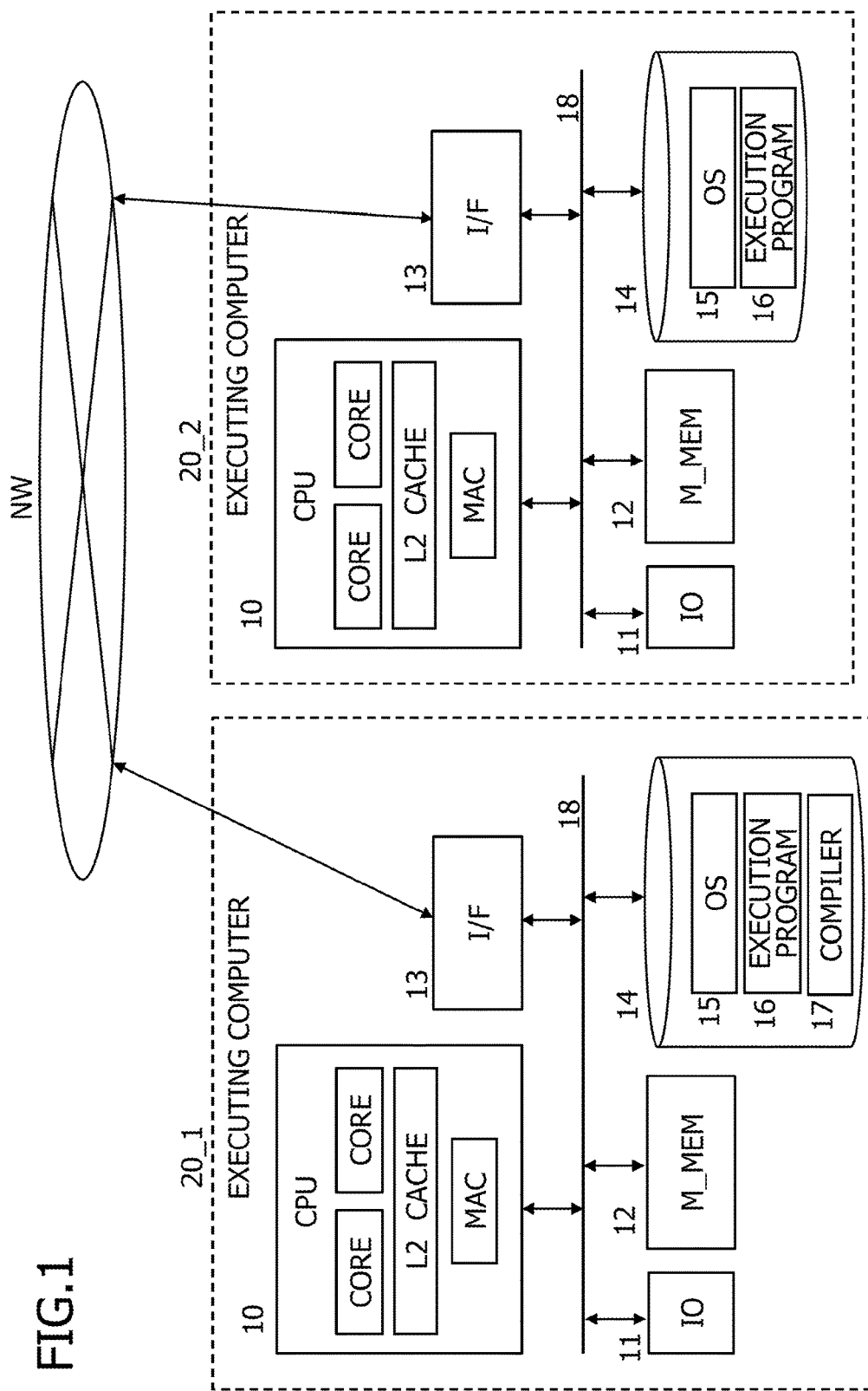
FIG. 1 is a diagram illustrating a configuration example of an executing computer that executes a program compiled in this embodiment.

FIG. 1 is a diagram illustrating a configuration example of an executing computer that executes a program compiled in this embodiment. The executing computer 20_1 of FIG. 1 is also the compiling device of this embodiment.

In this embodiment, the compiler optimizes a source program written in a parallel programming language (process-parallel program), and generates an execution program. The executing computer illustrated in FIG. 1 executes the execution program. Namely, a plurality of executing computers 20_1 and 20_2 execute the execution program in parallel. For example, two executing computers execute the execution program in parallel in each of their processes. Note, a single executing computer may execute the execution program in parallel in a plurality of processes.

The executing computer includes a central processing unit (CPU, hereinafter referred to as processor) 10 that has a plurality of CPU cores CORE, an L2 cache L2_CACHE, and a memory controller MAC, a main memory 12 access by the CPU to which is controlled by the memory controller MAC, and a storage 14 that is an auxiliary memory device. The executing computer further includes a network interface 13 connected to a network NW, an I/O control unit 11 that controls input from and output to outside, and busses 18 that connect these elements to each other.

The storage 14 stores an operating system (OS) 15, and an execution program 16. The storage 14 of the executing computer 20_1 on the left side stores a compiler program 17 in addition to the OS and execution program. The OS 15, execution program 16, and compiler program 17 are loaded in the main memory 12 and executed by the CPU 10.

FIG. 2 is a diagram illustrating one example of a source program written in a parallel programming language that uses PGAS. The source program in FIG. 2 has the Fortran 2008 coarray functionality. Hereinafter, the embodiment will be described with reference to this source program as a specific example.

This source program is explained simply below:

Line 2 defines dynamic allocation of a one-dimensional size of variable x.

Line 5 defines coarray co being an array of size 100. Symbol "*" represents an image number. An image corresponds to an execution unit (process during execution). The image number is designated within the brackets [ ]. The brackets [ ] that indicate a local image number can be omitted.

Line 7 is an if-statement, a branch instruction having a conditional statement that image number equals 2. Function "this_image( )" indicates the image number and calls a local image number when executed.

Line 9 allocates a memory space such that the size of component x of coarray co(i) is 8, if the image number is 2. % represents a component.

Line 13 allocates a memory space such that the size of component x of coarray co(i) is 10, if the image number is other than 2.

Line 18 assigns value 0 in each element of component x of each element co(i) of a local coarray co. Thus the arithmetic operation of assigning value 0 is performed a number of times corresponding to the size of the component x.

Line 21 synchronizes all the processes.

Line 23 is an if-statement, a branch instruction having a conditional statement that image number is other than 1.

Line 25 copies the content of component x of the coarray co of process 1 to each component x of the local array co, if the image number is other than 1. When this operation is executed, the following tasks are performed. Namely, the size of component x of the coarray co of process 1 is acquired, and if it is different from the size of component x of the local coarray co, the memory space of component x of the local coarray co is released, and a new memory space of the same size as that of process 1 is allocated.

After that, the value of component x of the coarray co of process 1 is acquired, and assigned to component x of the local coarray co.

FIG. 3 is a diagram illustrating the coarray co(100)[*] of FIG. 2. The left side represents the configuration based on the memory space allocation of line 13 (allocate (co(i) % x(10))), when the image number is other than 2, i.e., 1 or 3 to n. The right side represents the configuration based on the memory space allocation of line 9 (allocate (co(i) % x(8))), when the image number is 2.

In the example on the left side, array co has 100 elements co(1)-co(100), and each element has component x having 10 elements x(1)-x(10). That is, the size of component x is 10 (10 elements). On the other hand, in the example on the right side, array co has 100 elements co(1)-co(100), and each element has component x having 8 elements x(1)-x(8). That is, the size of component x is 8 (8 elements).

Figure 4:
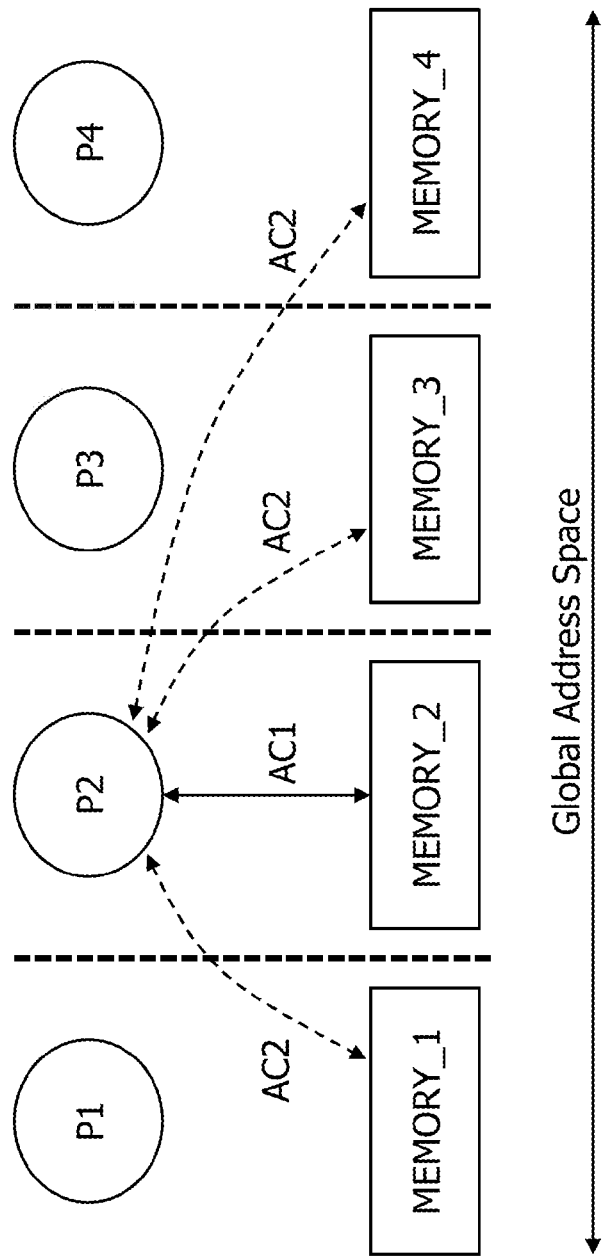
FIG. 4 is a diagram illustrating a partitioned global address space (PGAS).

FIG. 4 is a diagram illustrating a partitioned global address space (PGAS). In the drawing, circles represent processes P1 to P4, while rectangles indicate shared memories accessed by each of the processes. The global address space of the memory is partitioned into four memory spaces as indicated by broken lines. Each process can execute access AC1 at low cost to its own local memory space, while each process can execute access AC2 at high cost to memory spaces of other processes.

For example, the processor (CPU) of each executing computer illustrated in FIG. 1 accesses (AC1) its own main memory 12 via its memory controller MAC. Meanwhile, each processor (CPU) sends a message to the processor (CPU) of a different executing computer, and the processor that has received the message accesses (AC2) its main memory 12 via the memory controller MAC. Thus the cost of accessing its own local memory space is low, while the cost of accessing the memory space of a different processor is high.

As described above, the image of Fortran 2008 corresponds to an execution unit, i.e., process, during execution of the program. In the following description, the image will be referred to as "image" when used in an aspect of the source program of Fortran, and as "process" when used in conjunction with execution of the program.

Figure 5:
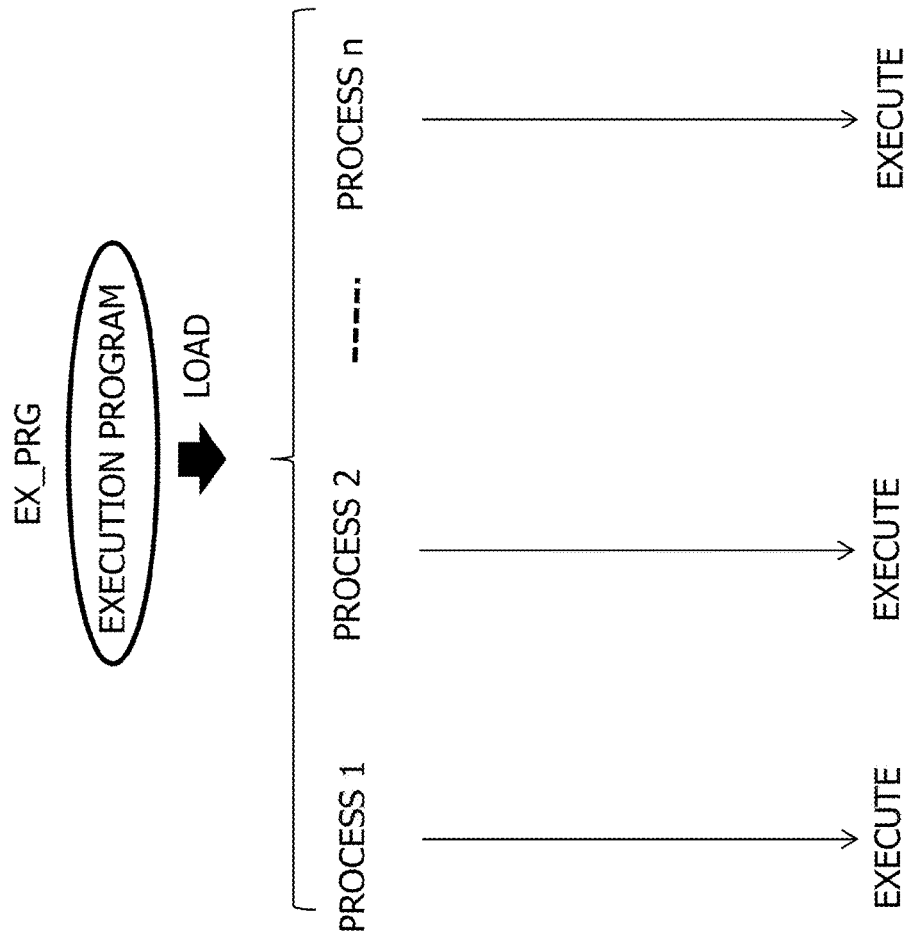
FIG. 5 is a diagram illustrating parallel execution in a plurality of processes of a source program translated (converted) to a single execution program by a compiler.

FIG. 5 is a diagram illustrating parallel execution in a plurality of processes of a source program translated (converted) to a single execution program by a compiler. Generally, a program written in a parallel programming language that uses PGAS such as, for example, a program that has the Fortran 2008 coarray functionality illustrated in FIG. 2 is normally translated into a single execution program by a compiler, and the single execution program is loaded to a plurality of processes, so that the plurality of processes execute the execution program in parallel.

In some cases, the effect of optimization by the compiler is low in the program executed in a plurality of processes as compared to serial execution programs. Four examples where the effect of optimization is low will be described below.

(1) The first example is the instruction (co(i) % x=0) in line 18 in FIG. 2, for example, for assigning value 0 to component x of each array element co(i). When this instruction is executed, the task of assigning value 0 is repeated a number of times that equals to the size of component x. For such instructions where a task is repeated a number of times, the compiler normally performs optimization by SIMD conversion or by loop unrolling. For example, SIMD conversion can reduce the number of iterations of the instruction to a number divided by the number of SIMD arithmetic units (4 in the case of a 4SIMD that processes four data sets with one instruction). Loop unrolling can reduce overheads of branch instructions in loops.

In the case with the program of FIG. 2, however, the size of component x differs depending on the image number, and therefore the number of iterations differs depending on the image number. Consequently, the compiler needs to add a plurality of comparison instructions in the optimization process in order to make the number of iterations of each image number different. When overheads due to the plurality of comparison instructions exceed the optimization effect by SIMD conversion, the efficiency is reduced contrary to the intention. With loop unrolling, likewise, the overheads due to the plurality of comparison instructions limit the optimization effect.

(2) The second example is the instruction (co(i) % x=co (i)[1] % x) in line 25 of FIG. 2, for example, for copying, between different image numbers (different processes), a variable or an array component to which a size varying per image number (process) can be dynamically allocated. This instruction is for copying the value (co(i)[1] % x) of each component of array co of image number "1" of the copy source to each component (co(i) % x) of array co of a local image number that is the copy destination. Component x further has ALLOCATABLE attributes. Therefore, the size of component x of array co of the image number of the copy destination differs, such as 8 when the local image number is 2, and 10 when it is other than 2. On the other hand, the size of component x of array co of image number 1 that is the copy source is 10. Therefore, when components x of the copy source and copy destination have different sizes, the size of the component x of the copy destination needs to be matched with the size of the component x of the copy source.

Thus, the instruction for copying noted above involves the following tasks performed by a local process: inquiring the size of component x of array co of image number 1 that is the copy source; if the size of component x of array co of the copy destination (local) is different from the size of component x of the array of the image number 1 of the copy source, releasing a memory space of the copy destination and allocating a memory space of the same size as that of the copy source; and acquiring the value of component x from the copy source and copying the value to the component x of the copy destination.

Therefore, when converting the source program into the execution program, the compiler adds a code for a local process to execute a communication for inquiring the size of component x of a different process. Such a task of referring to the size of component x of a different process needs a high communication cost, and reduces the optimization effect.

(3) The third example is the branch instructions such as line 7 and line 23 of FIG. 2, for example, which include a condition affected by an image number. The if-statement of line 7 includes the condition that the image number equals to "2", and the if-statement of line 23 includes the condition that the image number is other than "1".

The ordinary optimization includes constant propagation, and deletion of branch instructions when a propagated constant makes a conditional statement true or false. In the case with a process-parallel program, image numbers (process numbers) are run-time constants that do not change during execution, so that they can be the target of constant propagation. However, while an image number (process number) is fixed and becomes a constant in each process during the program is being executed by each process, the program is not being executed by each process during compilation. The compiler therefore needs to write an optimization program such as to be able to deal with a plurality of process numbers. As a result, the compiler is not able to set process numbers as constants during compilation and not able to use constant propagation.

(4) The fourth example is the same as the third example, the conditional branch instructions in line 7 and line 23 of FIG. 2. As one ordinary optimization process, when the conditions of branch instructions are all true based on profiling results, the branch instructions are deleted and the codes that would be executed if the conditional statements were false are deleted.

However, in the case with a process-parallel program, the processes each have different image numbers, so that not all the conditions of branch instructions that have conditional statements dependent on image numbers turn out true or false according to profiling results, and therefore the ordinary process mentioned above is not applicable. The condition of the if-statement in line 7 is 100% false in process 1, while it is 100% true in process 2. With such profiling results, generally, optimization is not possible.

First Embodiment

Figure 6:
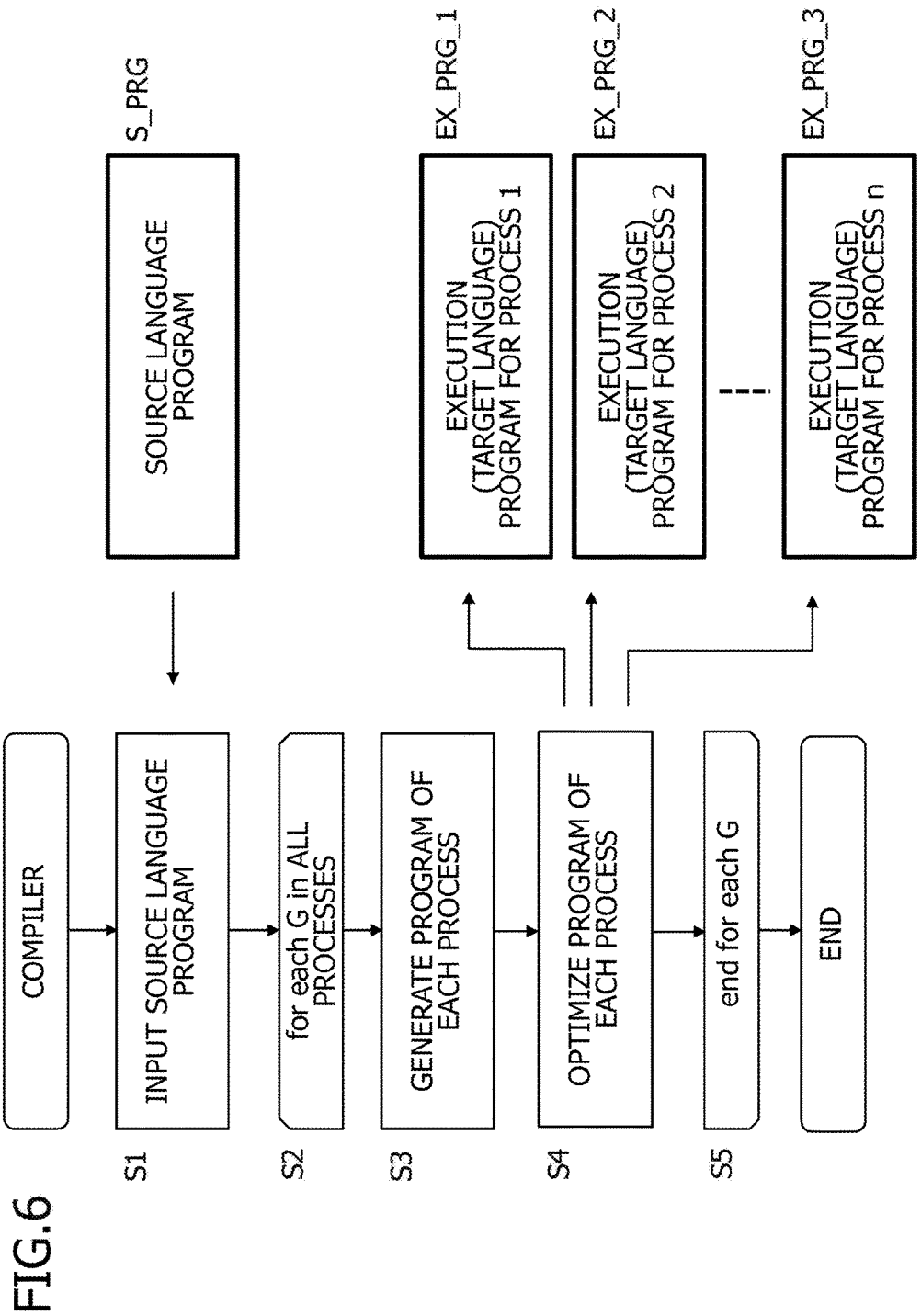
FIG. 6 depicts a flowchart of schematic process steps of the compiler program in this embodiment.

FIG. 6 depicts a flowchart of schematic process steps of the compiler program in this embodiment. Each block of the flowchart is executed by the processor executing the compiler. The processor first inputs a source language program (source program) S_PRG and stores it in the storage 14 (S1). The processor then repeats (S5), for each of all the processes (S2-S5), copying the source program to generate a program of each process (S3), and optimizing (S4) the program of each process. As a result, n execution programs EX_PRG_1 to EX_PRG_n are generated for processes 1 to n.

When executing the programs, the compiler loads each execution program to the memory space of each corresponding process and executes the execution programs in parallel. The compiler may generate execution program files by attaching such a load program to the n execution programs.

Figure 7:
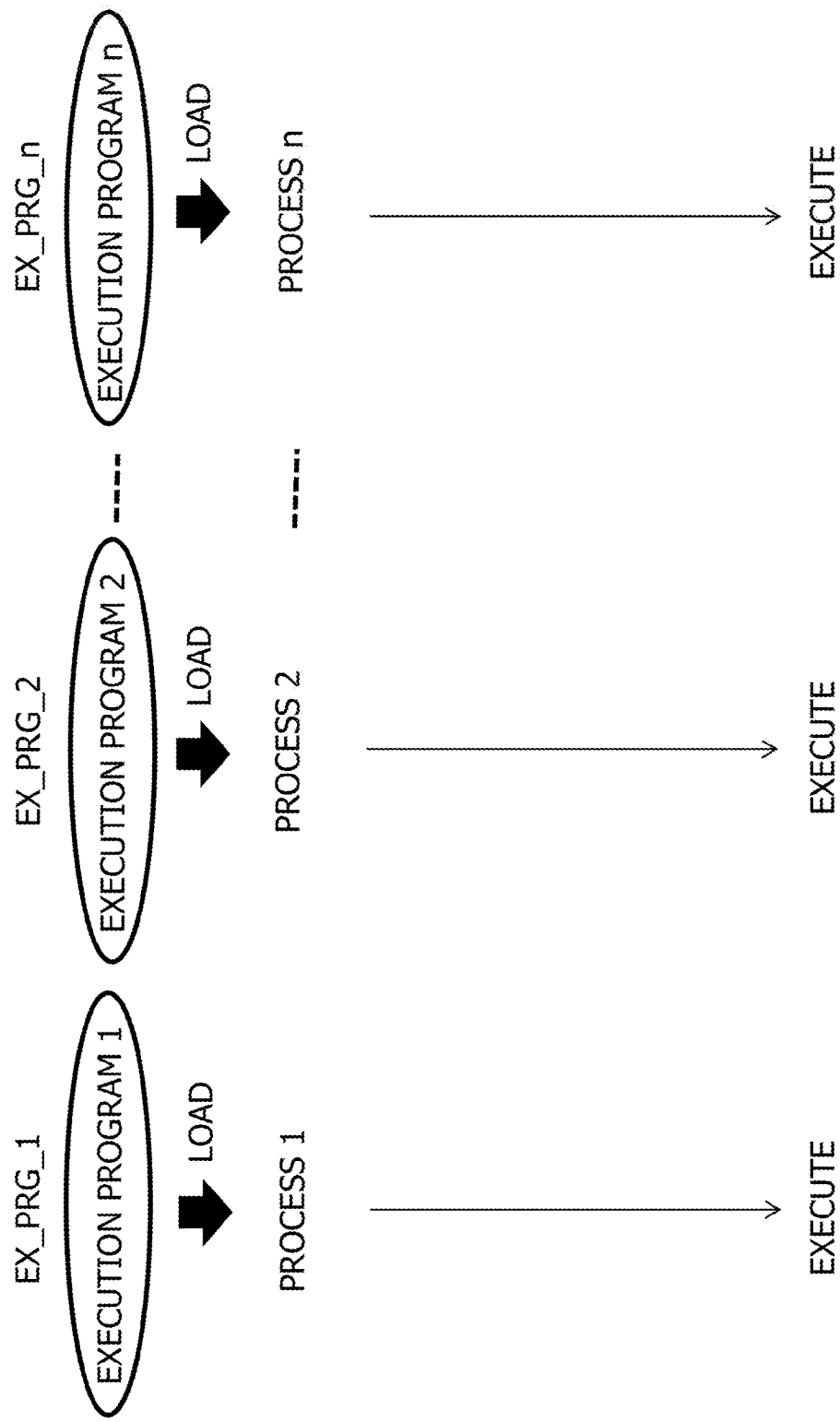
FIG. 7 is a diagram illustrating loading of execution programs to each of processes and execution thereof in this embodiment.

FIG. 7 is a diagram illustrating loading of execution programs to each of processes and execution thereof in this embodiment. Unlike the loading and execution of FIG. 5, the execution programs EX_PRG_1 to EX_PRG_n that have been generated for each process and optimized for each process are loaded to the main memory of the processor that executes each process, and executed in each process.

In the program optimization step (S4) of each process in FIG. 6, process numbers (image numbers) can be set as constants. Moreover, conditional statements dependent on image numbers can sometimes be set as constants. Therefore, in the third and fourth examples described above, the processor can set image numbers as constants and perform constant propagation during compilation, so that conditional statements are determined by constants (determined either as true or false), and the processor can delete the branch instructions, as well as delete the codes that would be executed if the conditional statements were oppositely determined.

The size dynamically allocated to a variable in each process is determined in the execution program of a specified process. In respect of the first example, the number of iterations of each process in the execution program is determined, so that a plurality of comparison instructions is made redundant in SIMD conversion and loop unrolling. In respect of the second example, since the size of a variable is determined in each process, communication instructions or the like for inquiring variable sizes of other processes can be omitted. In some cases, array values of other processes can be set as constants in copy instructions, so that communication instructions for referring to values of the copy source can also be omitted. This example of copy instruction is not included in FIG. 2 so it will be described later with reference to FIG. 19.

[Process Steps of the Compiler]

Figure 8:
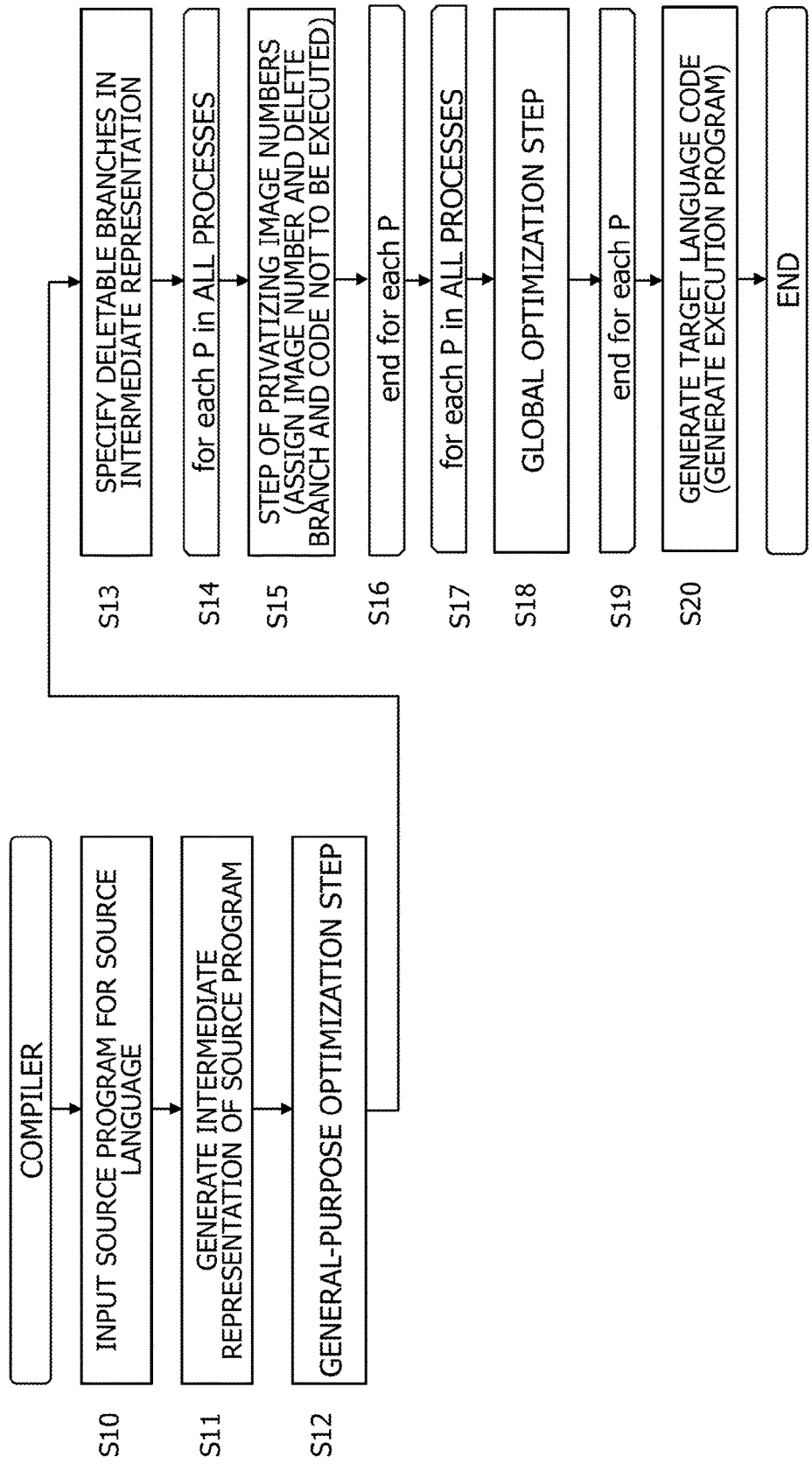
FIG. 8 is a diagram depicting a flowchart of the process steps of the compiler in the first embodiment.

FIG. 8 is a diagram depicting a flowchart of the process steps of the compiler in the first embodiment. The processor that executes the compiler program inputs a source language program (source program) and stores it in the storage (S10). One example of the source program is a program that includes Fortran 2008 coarrays illustrated in FIG. 2 and variables of ALLOCATABLE attributes.

Next, the processor generates an intermediate representation program (S11) of the source program. An intermediate representation program is a program having the source program code translated into a code written in compiler's intermediate language. The processor converts the source program into an intermediate representation program for the purpose of enhancing the optimization efficiency of the source program.

FIG. 28 is a diagram that depicts an intermediate representation program example and its flowchart. The source program 30 written in Fortran includes a code that assigns the sum of variables b and c to variable a if function this_image( ) for calling a local image number equals to variable x. As compared to this, the intermediate representation program 31 includes a code that first assigns variable x to variable t1 (311), assigns a return value (local image number) of function this_image( ) to variable t2 (312), and if variable t1 equals to variable t2 (313), then assigns the sum of variables b and c to variable t3 (314), and assigns variable t3 to variable a (315).

In some cases, an optimization process may be facilitated or its effect may be enhanced for the program that describes conditional statements and assignment statements with variables after assigning values to variables t1, t2, and t3 as described above.

As demonstrated above, the intermediate representation program is substantially the same as the source program, as the intermediate representation program only changes part of the description of the original source program. Therefore, the source program of FIG. 2 will be described as intermediate representation program below.

Referring back to FIG. 8, the processor performs an ordinary optimization step to the intermediate representation program (S12). The ordinary optimization step is an optimization process that does not depend on the architecture of the computer executing the execution program, such as, for example, constant propagation and deletion of branch instructions. An optimization process dependent on the architecture of the executing computer such as SIMD conversion may be performed in addition to the ordinary optimization step. Since the source program is converted to an intermediate representation program, optimization may progress by the ordinary optimization step described above and by SIMD conversion.

Next, the processor executes a step of specifying deletable branch instructions in the intermediate representation program (S13). Deletable branch instructions are branch instructions whose conditional statements will become constants (conditional statements will be either true or false) if the local image number in each process is determined. Namely, they are branch instructions that have conditional statements dependent on local image numbers. In intermediate representation programs generated for each process by copying intermediate representation programs, the process numbers have already been determined. Therefore, the results of determination of conditional statements in branch instructions sometimes become constants, which allows optimization such as deletion of branch instructions to be performed.

In this step S13, the processor substitutes functions and variables indicating image numbers in the intermediate representation program with given constants, performs constant propagation, and adds branch instructions whose conditional statements are constants (true or false) to a list of deletable branches. This step will be described in more detail with reference to FIG. 9 later.

The processor then repeatedly executes a step of privatizing image numbers (S15) for each of all the processes (S14, S16). The step of privatizing image numbers involves generating copies of the intermediate representation program for each of a plurality of images (plurality of processes), and executing deletion of branch instructions, assignment of image numbers, ordinary optimization step, and SIMD conversion step based on corresponding image numbers in the copied intermediate representation programs (optimization target intermediate representation programs). This will be described more specifically with reference to FIG. 11.

Further, the processor executes a global optimization step (S18) for each of all the processes (S17, S19). When the step of privatizing image numbers S15 is complete, the optimization target intermediate representation program of each process has been optimized. Therefore, in the global optimization step, the processor sets the size (constant) of a dynamic space of a referent process in the code that refers to dynamic spaces of other processes, or sets a coarray value of a referent process in the code that refers to coarrays of other processes, in the optimization target intermediate representation program of each process. This will be described more specifically with reference to FIG. 12.

Lastly, the processor generates a program code in the target language of the compiler from the optimization target intermediate representation program that has been optimized (S20). For example, if the source program is Fortran, the target language program is an assembly language program, or its execution program in an object language.

[Step of Specifying Deletable Branches S13]

Figure 9:
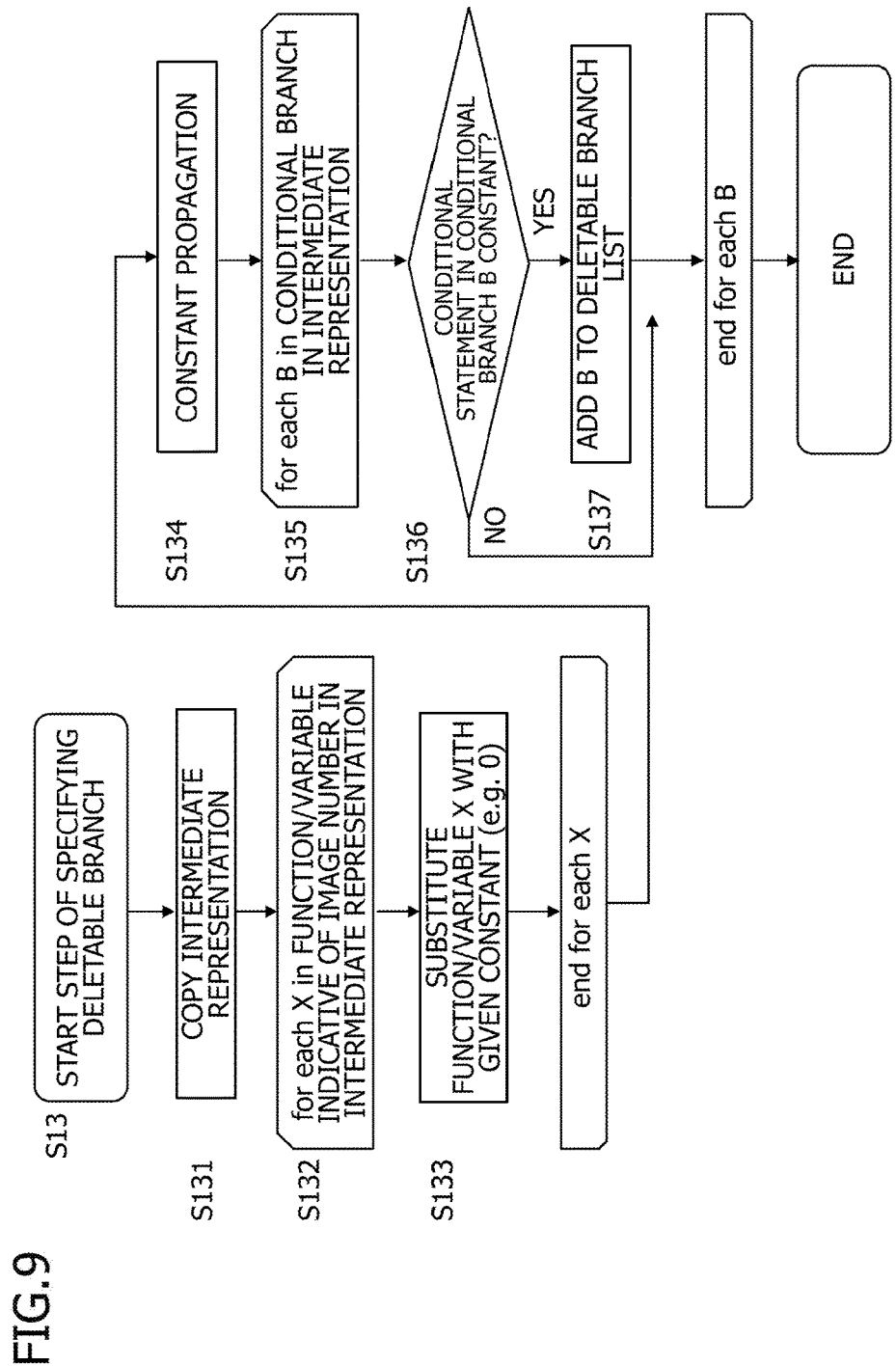
FIG. 9 is a diagram depicting a flowchart of the step of specifying deletable branches.

FIG. 9 is a diagram depicting a flowchart of the step of specifying deletable branches. The step of specifying deletable branches S13 includes a step of copying the intermediate representation program S131. The processor then executes the following steps to the copied intermediate representation program.

Next, the processor substitutes each of functions (or variables) X (S132) that indicate an image number in the intermediate representation program, for example function this_image( ) that has a local image number as a return value, with a given constant, such as "0" (S133). The example of variable indicative of an image number is not included in the source program of FIG. 2.

The processor then executes constant propagation (S134) by substituting a given constant for function X. In some cases, this makes the arithmetic instruction or conditional statement of function this_image( ) for example, a constant. The processor thus checks (S136) each of conditional branch instructions in the intermediate representation program (S136) if the conditional statement of the conditional branch instruction has become a constant (true or false), and adds the conditional branch instructions whose conditional statement has become a constant to the list of deletable branches (S137).

Figure 10:
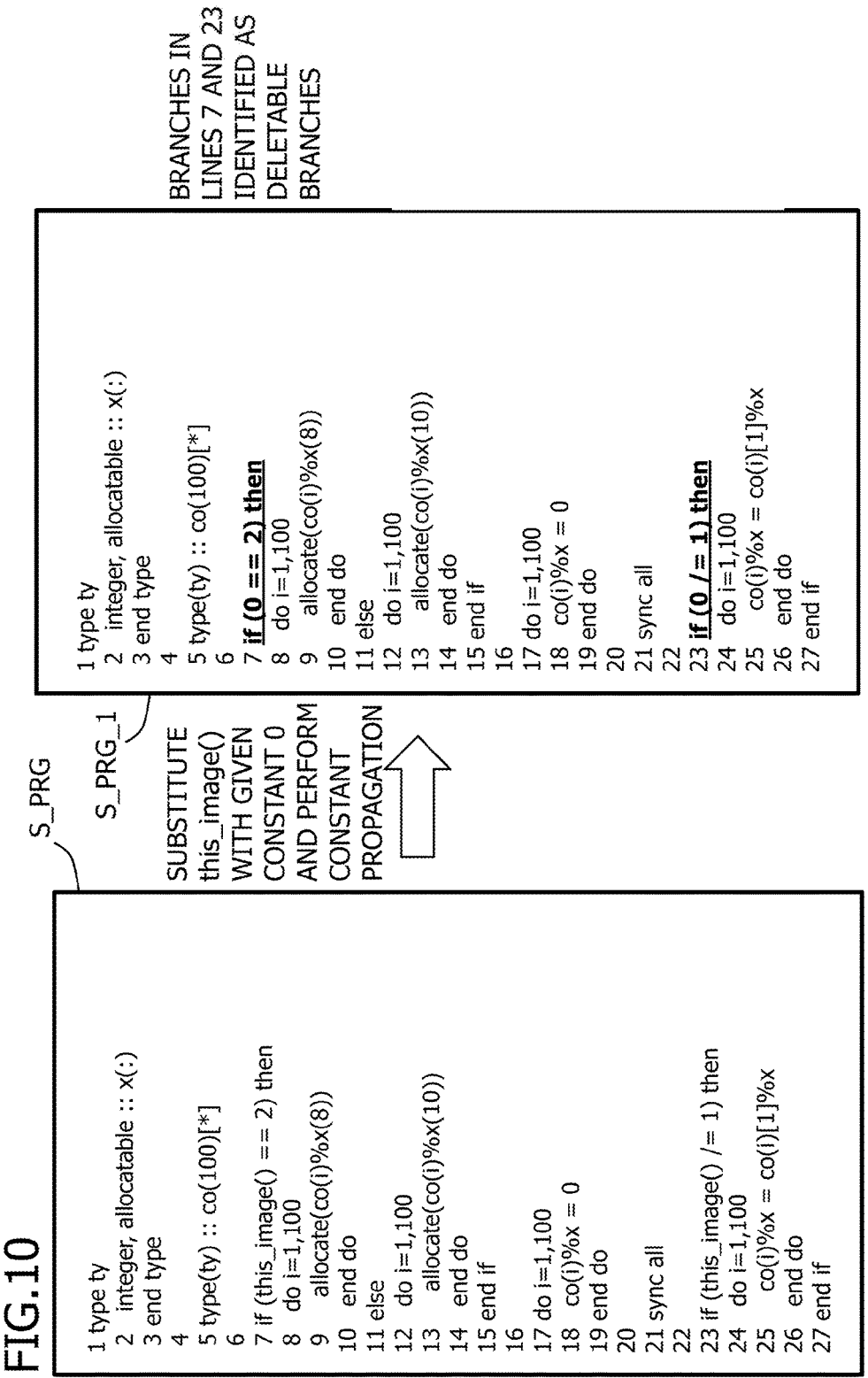
FIG. 10 is a diagram illustrating a concrete example of the step of specifying deletable branches in the case with the source program of FIG. 2.

FIG. 10 is a diagram illustrating a concrete example of the step of specifying deletable branches in the case with the source program of FIG. 2. The processor extracts function this_image( ) indicative of image numbers written in line 7 and line 23 of the source program S_PRG on the left side, and substitutes them with a given constant such as "0" for example (S133) as shown in the right side. The processor then executes constant propagation (S134). Note, in the source program S_PRG on the left side of FIG. 10, no constant propagation occurs after the substitution of constant "0" for function this_image( ).

The following description is an example of program where constant propagation occurs:
t1=this_image( )
if (t1==2) then
Substituting function this_image( ) with constant "0" in this program renders the description as follows:
t1=0
if (t1==2) then
Performing constant propagation on t1=0 renders the description as follows:
t1=0
if (0==2) then
Consequently, the conditional statement (0==2) in the if-statement, which is a conditional branch statement, is false, and becomes a constant. As described above, there are some cases where constant propagation makes conditional statements in if-statements constants.

However, in the case with the following program, substituting function this_image( ) with an image number does not make the determination result of a conditional statement a constant, since there is a variable a in the conditional statement of the branch instruction, and the branch instruction is not determined as deletable:
t1=this_image( )
if (t1==a) then
Referring back to FIG. 10, the processor substitutes functions and variables indicative of image numbers with constants, and performs constant propagation, as a result of which the processor specifies the conditional branch instructions of lines 7 and 23 in the source program S_PRG_1 on the right side as deletable branch instructions, and adds them to the list of deletable branches.

[Step of Privatizing Image Numbers]

As indicated in FIG. 8, after performing the step S13 of specifying deletable branches from the intermediate representation program illustrated in FIG. 9, the step of privatizing image numbers S15 is executed repeatedly to each of the plurality of processes. Thus an optimization target intermediate representation program is generated for each of the plurality of processes, and a first optimization step S15 is executed to each of the plurality of optimization target intermediate representation programs.

Figure 11:
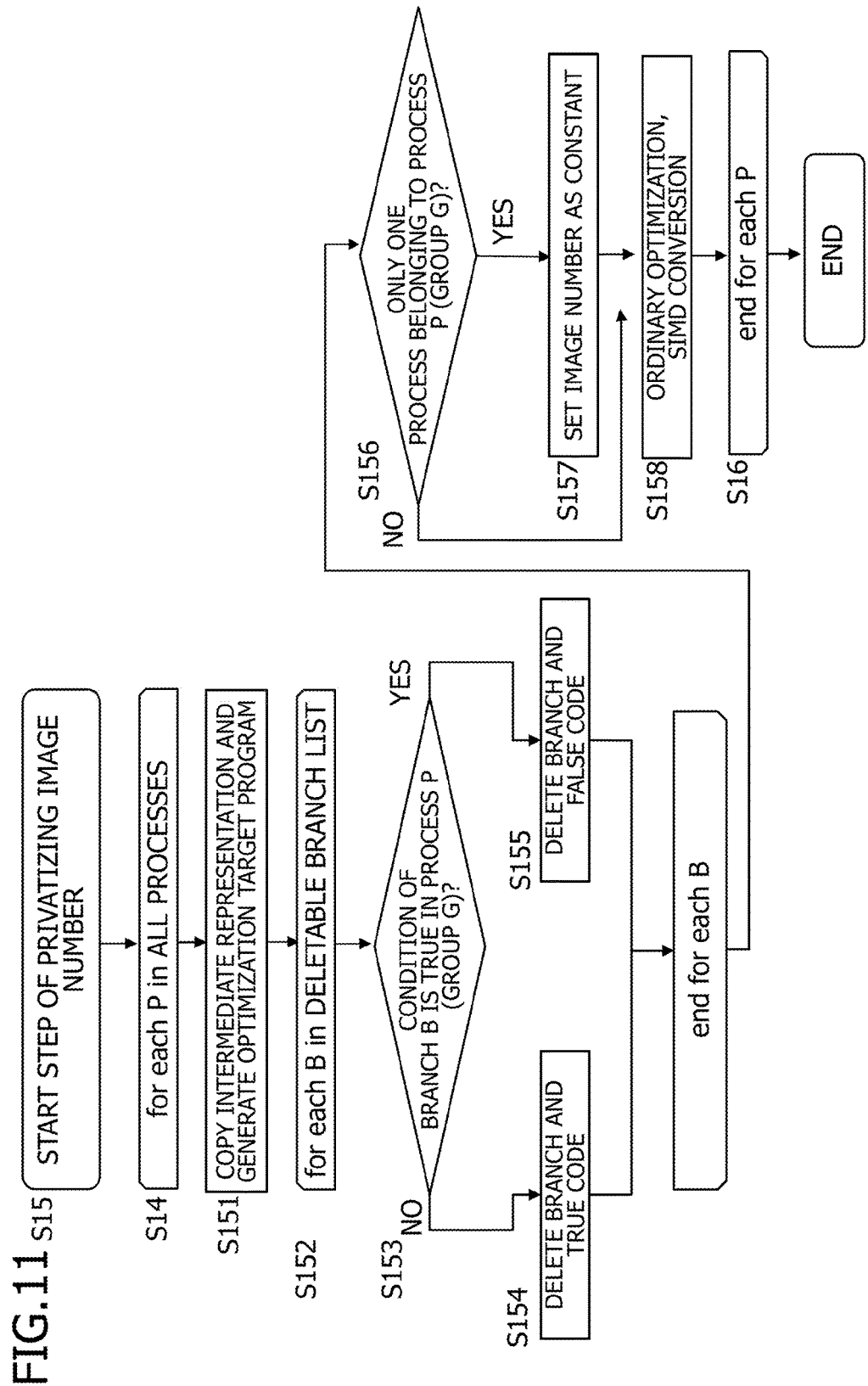
FIG. 11 is a diagram depicting a flowchart of the step of privatizing image numbers.

FIG. 11 is a diagram depicting a flowchart of the step of privatizing image numbers. FIG. 11 also illustrates steps S14 and S16 of FIG. 8 that are executed repeatedly to all the processes P (or group G of all the processes). Process groups will be described in the second embodiment later.

The processor that executes the compiler repeatedly executes steps S151 to S158 to each of all the processes (S14). Namely, the processor copies the intermediate representation program to generate (S151) an optimization target intermediate representation program (hereinafter sometimes referred to as "optimization target program" for the sake of simplicity) of a target process (image number). The processor then performs the following optimization step to the optimization target program of the target process.

Next, the processor substitutes functions and variables indicative of image numbers with the image number of the target process for each of the deletable branch instructions on the list of deletable branches in the optimization target program (S152), and performs constant propagation, after which the processor checks whether the conditional statement is true or false (S153). For the optimization target program, when the conditional statement is false, the processor deletes the code that would be executed when the branch instruction and conditional statement were true (S154). Conversely, when true, the processor deletes the code that would be executed when the branch instruction and conditional statement were false (S155).

By this step, the branch instructions in line 7 and line 23 in the source program of FIG. 2 are deleted, and the code that would be executed when the value of the conditional statement (determination result) were different is deleted. Thus, if the process number is "2", the branch instructions in lines 7, 11, and 15 and the code in lines 12 to 14 (code to be executed when the conditional statement were false) are deleted from the code in lines 7 to 15. If the process number is other than "2", the branch instructions in lines 7, 11, and 15, and the code in lines 8 to 10 (code to be executed if the conditional statement were true) are deleted. Similarly, if the process number is other than "1", the branch instructions in lines 23 and 27 are deleted from the code in lines 23 to 27, while, if the process number is "1", the branch instructions in lines 23 and 27, and the code in lines 24 to 26 are deleted. Since there is no code to be executed if the conditional statement of the branch instruction in line 23 were false in the source program, simply the branch instructions in lines 23 and 27 are deleted if the process number is "1".

Next, if there is one process that belongs to the target process group (YES at S156), the processor replaces the image numbers in the optimization target program (S157) with the process number of the target process that is constant. In the first embodiment, the step of privatizing image numbers is executed for each process, so that the step S156 is always YES, and the image numbers in the optimization target program are replaced with the process number of the target process that is constant. When the step is executed per group in the second embodiment, the image number is set as a constant if there is only one process that belongs to the group.

The processor then executes an ordinary optimization step and SIMD conversion step (S158) to the optimization target program of the target process. As a result of performing steps S154, S155, and S157, it is expected that variables that can be set as constants are detected, and by setting such variables and image numbers as constants, optimization such as constant propagation is accelerated.

By setting image numbers as constants, the sizes of variables that are different depending on each image number are determined. Therefore, when converting arithmetic instructions with such variables to SIMD, comparison instructions for determining the number of iterations can be omitted. The arithmetic instruction (co(i) % x=0) in line 18 of the source program of FIG. 2 is the target to be converted to SIMD. Namely, the size of component x of process 2 is 8, while the size of component x of other processes than process 2 is 10. See the line 7, 9 and 13 of the program of FIG. 2. Therefore, the arithmetic instruction in line 18 is repeated 8 times in process 2, while it is repeated 10 times in other processes than process 2. That is, when executed by a 4SIMD arithmetic unit, the arithmetic instruction of line 18 is converted to two 4SIMD instructions (e.g., assembly code) in process 2, while it is converted to two 4SIMD instructions and one 2SIMD instruction (assembly code) in other processes than process 2.

Figure 15:
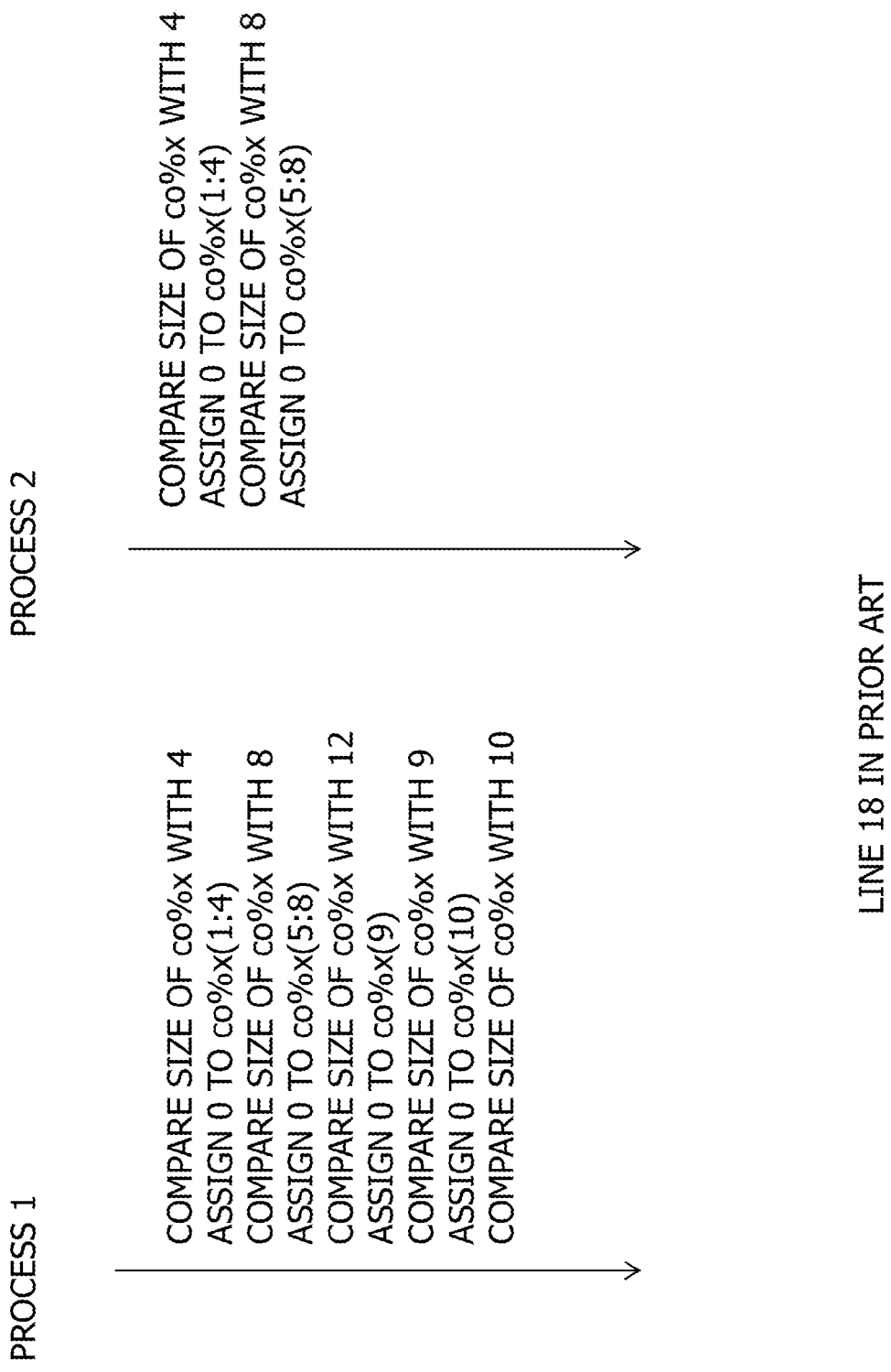
FIG. 15 is a diagram illustrating code examples of the arithmetic instruction in line 18 converted to SIMD.
Figure 16:
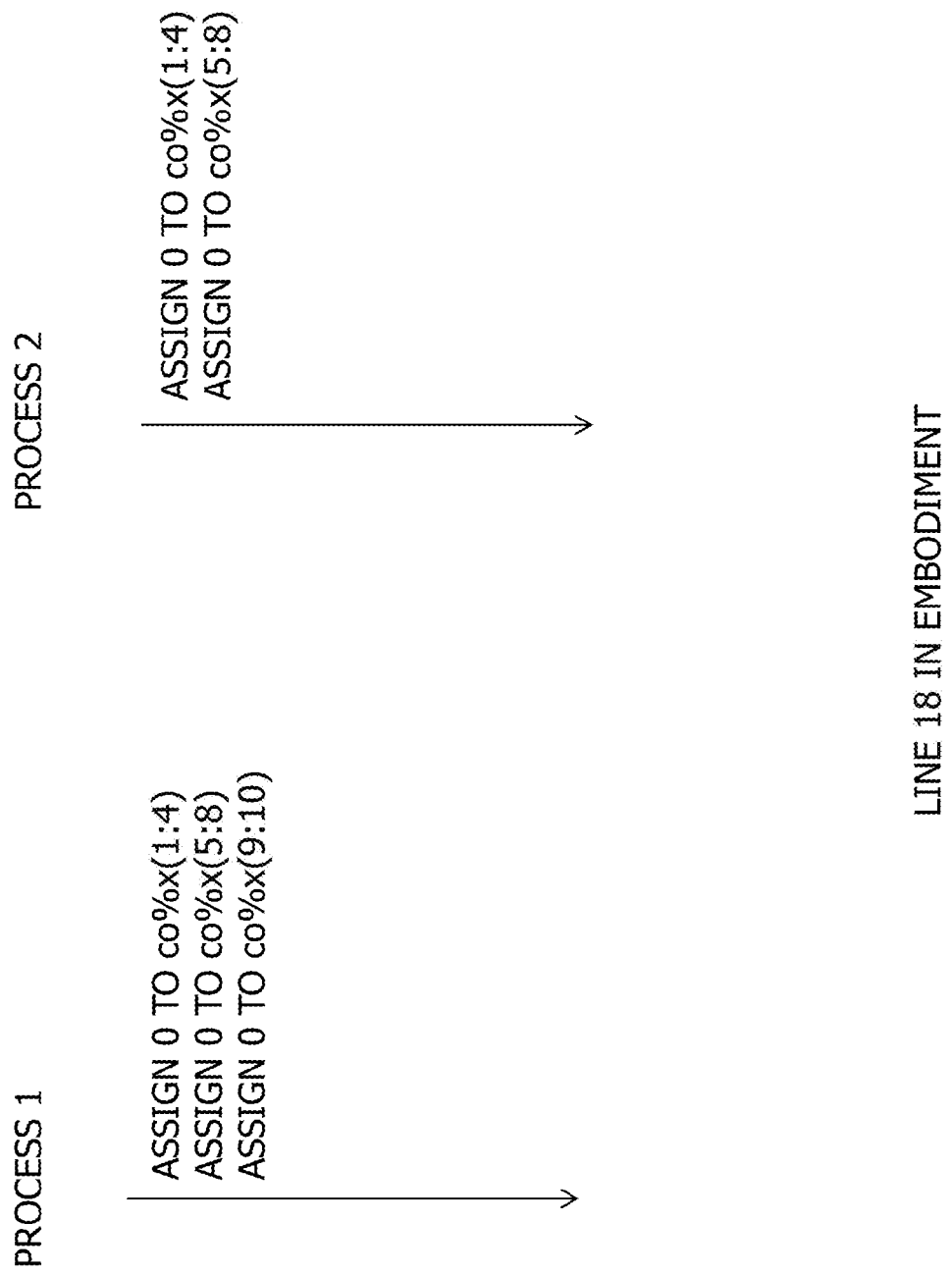
FIG. 16 is a diagram illustrating code examples of the arithmetic instruction in line 18 converted to SIMD.

FIGS. 15 and 16 are diagrams illustrating code examples of the arithmetic instruction in line 18 converted to SIMD. FIG. 15 illustrates the code example after converted to SIMD when the embodiment is not applied, while FIG. 16 illustrates the code example after converted to SIMD when the embodiment is applied. Since four store instructions are executed by a 4SIMD arithmetic unit, the 4SIMD store instruction is "assign 0 to co % x(1:4)", for example.

In the case of FIG. 15 where the embodiment is not applied, the size of component x of process 1 is 10. During compilation, however, the size of component x of array co varies in each process in the source program of FIG. 2, so that the code needs to be made executable with any process number. Therefore, the code after conversion to SIMD in process 1 is:

when component size is 4 or more as determined by "comparison instruction for comparing size of array component co % x with 4", the 4SIMD store instruction "assign 0 to co % x(1:4)" is executed;

when component size is 8 or more as determined by "comparison instruction for comparing size of array component co % x with 8", the 4SIMD store instruction "assign 0 to co % x(5:8)" is executed;

when component size is not 12 or more as determined by "comparison instruction for comparing size of array component co % x with 12", the non-SIMD store instruction "assign 0 to co % x(9)" is executed;

when component size exceeds as 9 as determined by "comparison instruction for comparing size of array component co % x with 9", the non-SIMD store instruction "assign 0 to co % x(10)" is executed; and in executing "comparison instruction for comparing size of array component co % x with 10", there is no case where component size exceeds 10, so that the instruction code ends.

In the case with process 2, since the size of component x is 8, the code is as indicated in FIG. 15. Namely, after the size of component co % x being 8 is returned in the "comparison instruction for comparing size of array component co % x with 8" in the code after conversion to SIMD in process 1, no further tasks are performed.

On the other hand, in the case of FIG. 16 where the embodiment is applied, the optimization target intermediate representation program is optimized for each process. Since the size of component x has been determined as 10 in the program of process 1, the code after conversion to SIMD of process 1 does not include a comparison instruction, and has only two 4SIMD store instructions and one 2SIMD store instruction.

Similarly, the size of component x has been determined as 8 in the program of process 2, so that the code after conversion to SIMD of process 2 does not include a comparison instruction, and has only two 4SIMD store instructions.

As demonstrated above, the code after conversion to SIMD does not include a comparison instruction in the case of FIG. 16, which contributes to reduction of run time.

FIG. 14 is a diagram illustrating optimization target programs generated for images 1, 2, and 3 to n and to which the optimization step of FIG. 11 is executed. The three programs illustrated in FIG. 14 will be similar after the global optimization step to be described later. The optimization step of FIG. 11 will be described in specific terms with reference to FIG. 14.

In the program generated for image 1 (process 1), the codes in lines 7 to 11 and lines 23 to 27 are deleted from the program of FIG. 2, and the arithmetic instruction in line 18 is converted to SIMD.

Meanwhile, in the program generated for image 2 (process 2), the codes in lines 7, 11 to 15 and lines 23 and 27 are deleted from the program of FIG. 2, and the arithmetic instruction in line 18 is converted to SIMD.

In the program generated for images 3 to n (processes 3 to n), the codes in lines 7 to 11 and lines 23 and 27 are deleted from the program of FIG. 2, and the arithmetic instruction in line 18 is converted to SIMD.

[Global Optimization Step]

As indicated in FIG. 8, after performing the step of privatizing image numbers of FIG. 11 (first optimization step), the processor executes the global optimization step S18 (second optimization step) to each of all the processes.

Figure 12:
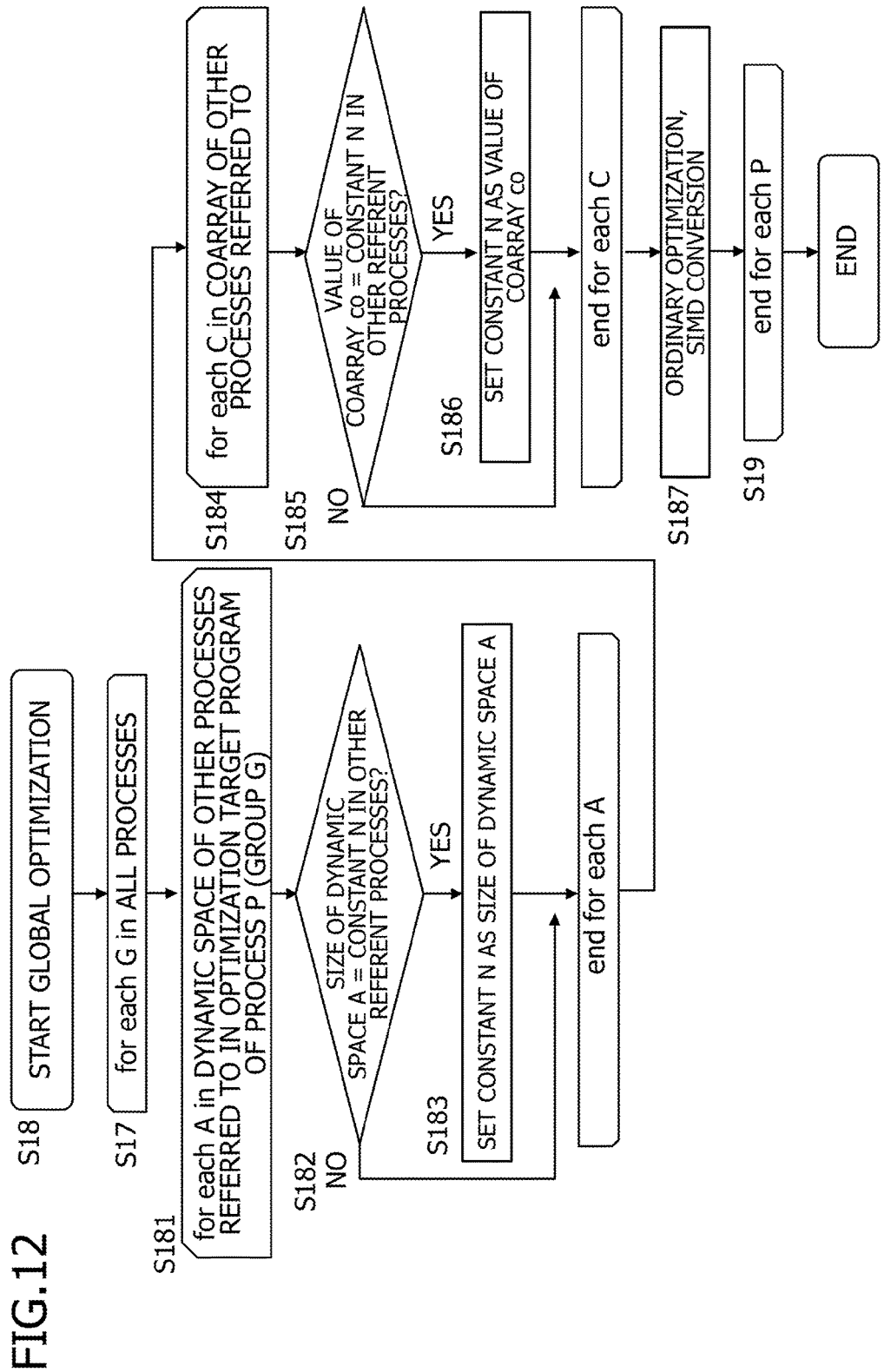
FIG. 12 is a diagram depicting a flowchart of the global optimization step.

FIG. 12 is a diagram depicting a flowchart of the global optimization step. FIG. 12 also includes steps S17 and S19 that repeatedly executes for all the processes P (or all the process groups G) of FIG. 8. The global optimization step involves setting the information determined by the step of privatizing image numbers (first optimization step), for example, the size of a dynamic space that varies for each image, or the value of a coarray of each image, as a constant, to instruction codes for reference between processes each other in the optimization target program of each process. Steps S181 to S183 regarding the sizes of dynamic spaces of other processes, and steps S184 to S186 regarding the coarray values of other processes correspond to the instruction codes to be set the determined information as a constant. The global optimization step further includes an ordinary optimization and SIMD conversion step S187 to be executed again.

The processor that executes the compiler repeatedly executes, for each of instruction statements for referring to dynamic spaces of other processes, (1) extracting references to dynamic spaces of other processes within the optimization target program of each target process, and (2) for all of these references (S181), if the size of dynamic space in other referent destination processes is a constant (YES at S182), setting this constant as the size of dynamic space (S183).

The source program of FIG. 2 includes an arithmetic instruction in line 25 for assigning component co(i)[1] % x of coarray of process 1 to component co(i) % x of coarray of local process. Code [*] for designating process number can be omitted for coarray co of local process. Since component x has ALLOCATABLE attributes and is assigned with a dynamic space, this arithmetic instruction is broken down to the following tasks.

Namely, it is divided into the tasks of:

(1) executing a communication to process 1 for referring to the size of component co(i)[1] % x of coarray of process 1;

(2) obtaining the size of co(i) % x of coarray of local process;

(3) comparing both sizes;

(4) if they are different, releasing a memory space assigned to the coarray component of local process;

(5) assigning a memory space of the size of coarray component of process 1 to the coarray component of local process; and (6) executing a communication to process 1 for referring to the value of coarray component of process 1, to assign it to the coarray component of local process. Therefore, the arithmetic instruction in line 25 includes references to dynamic spaces of other processes.

Thus, the processor checks the optimization target program of image 1 that has been subjected to the step of privatizing image numbers to determine whether or not the size of component co(i)[1] % x of coarray of process 1 is a constant. In the optimization target program of image 1 illustrated in FIG. 14, the size of coarray component co(i)[1] % x in line 13 is set to 10. Therefore, in the optimization target programs of image 2 and images 3 to n, the processor deletes the tasks for communication to process 1 in subdivision step (1) of the arithmetic instruction in line 25, and sets the size of the coarray component co(i)[1] % x to "10".

Figure 17:
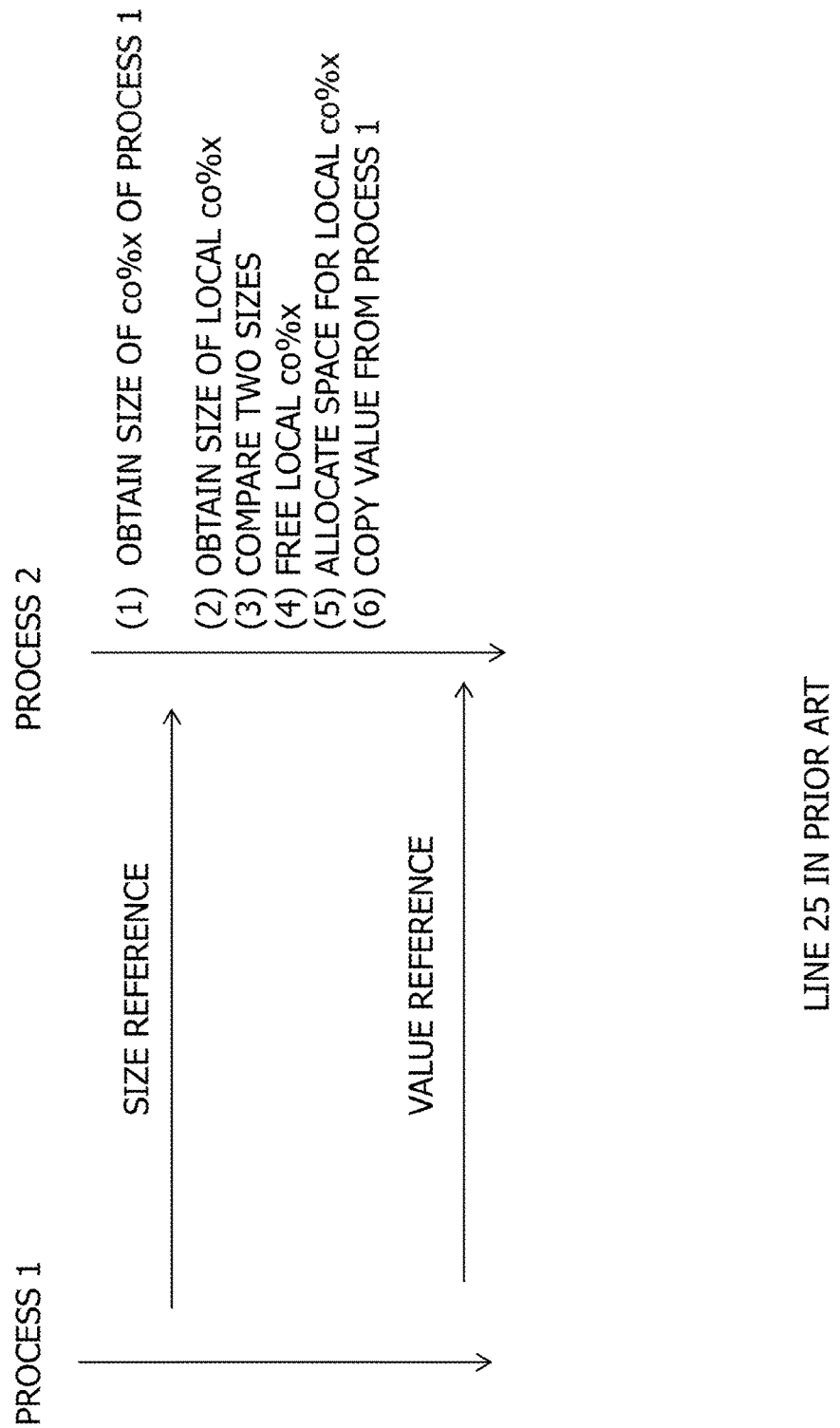
FIG. 17 is a diagram illustrating examples of assembly code of the arithmetic instruction in line 25.
Figure 18:
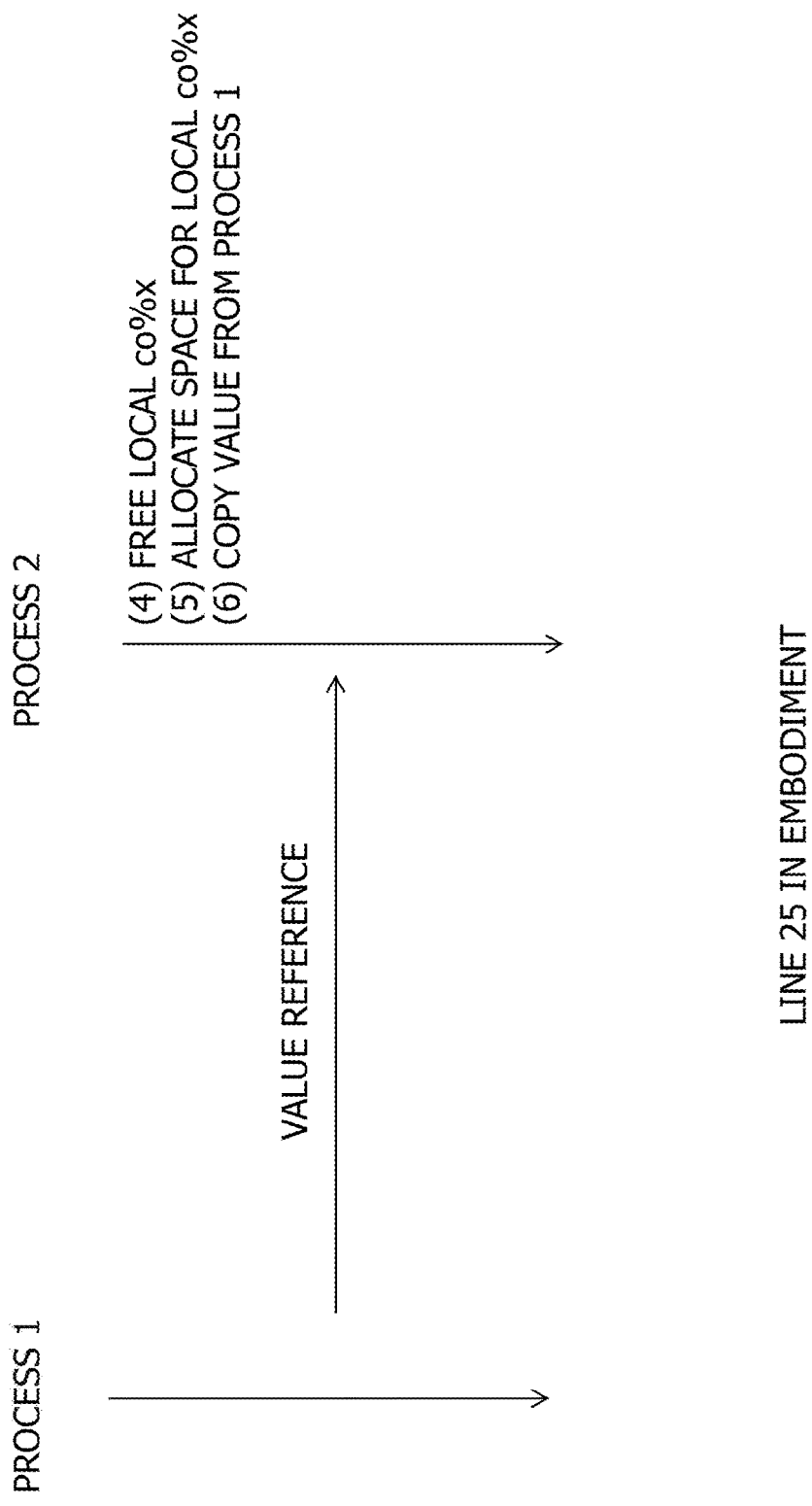
FIG. 18 is a diagram illustrating examples of assembly code of the arithmetic instruction in line 25.

FIGS. 17 and 18 are diagrams illustrating examples of assembly code of the arithmetic instruction in line 25. FIG. 17 illustrates the assembly code example when the embodiment is not applied, and FIG. 18 illustrates the assembly code example when the embodiment is applied. In the case with FIG. 17, the compiler converts the arithmetic instruction in line 25 to assembly code with the above-listed six tasks. On the other hand, in the case with FIG. 18, the processor that executes the compiler has detected that the coarray component size of process 1 is 10, that the coarray component size of processes other than process 2 is also 10, and that the coarray component size of process 2 is 8. Therefore, the subdivision steps (1) to (3) of FIG. 17 are deleted so that the assembly code has only subdivision steps (4) to (6).

Referring back to FIG. 12, the processor repeatedly executes extracting references to coarrays of other processes within the optimization target program of each target process, and for all of these references (S184), if the value of coarray in other referring destination processes is a constant (YES at S185), setting this constant to the coarray (S186). The reference to coarray values of other processes is not included in the program of FIG. 14. Therefore, another program is illustrated in FIG. 19 and described in specifically.

Figure 19:
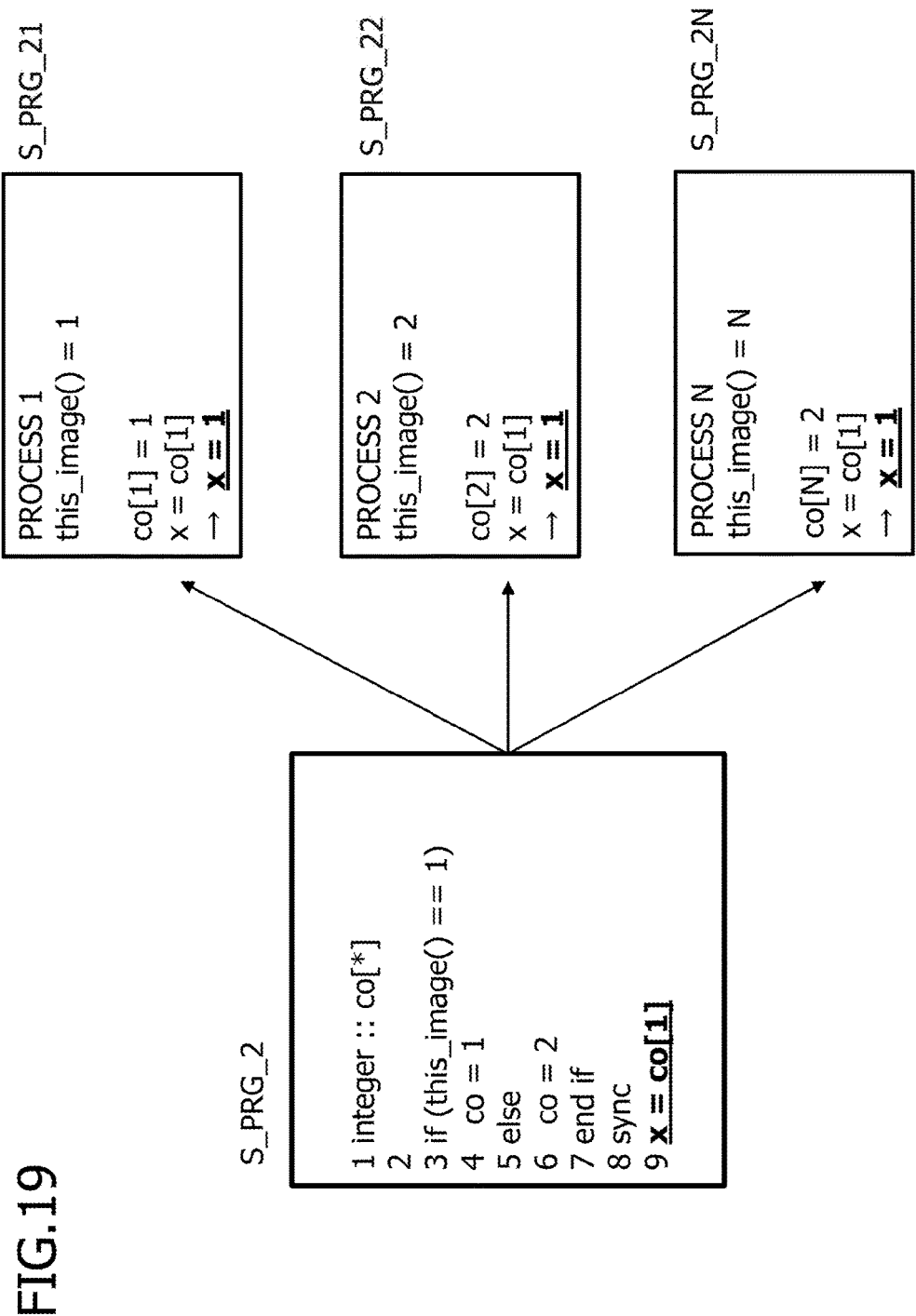
FIG. 19 is a diagram illustrating a program example including references to coarrays of other processes, and a global optimization step.

FIG. 19 is a diagram illustrating a program example including references to coarrays of other processes, and a global optimization step. Program S_PRG_2 includes a code that defines coarray in line 1, a conditional branch instruction (if-statement) with a conditional statement that image number (this_image( ) equals to 1 in line 3, an arithmetic instruction for assigning "1" to local coarray co if the image number equals to 1 in line 4, an arithmetic instruction for assigning "1" to local coarray co if the image number does not equal to 1 in line 6, and an arithmetic instruction for assigning the value of coarray co of process 1 to variable x in line 9.

This arithmetic instruction in line 9 of program S_PRG_2 includes references to coarray values of other processes. In this case, since line 4 demonstrates that array co of process 1 is "1" (co[1]), it is determined that co[1]=1. Alternatively, by referring to program S_PRG_21 of process 1, it is determined that co[1]=1. Therefore, the processor obtains value "1" of array co[1] of process 1 from the intermediate representation program of process 1, and converts the arithmetic instructions x=co[1] in line 9 of programs S_PRG_21, 22, and 23 generated in respective processes to x=1 (S186). Thus the communication task for referring to the coarray value of process 1 can be deleted from the assembly code of the arithmetic instruction in line 9.

Referring back to FIG. 12, the processor executes the ordinary optimization step and SIMD conversion step to the optimization target program of each target process (S187). The ordinary optimization is similar to the one described in the foregoing. In the SIMD conversion step, the arithmetic equation in line 25 is converted to SIMD. In this SIMD conversion step, since the processor can detect that the size of coarray component x of process 1 is 10 from the optimization target program of process 1 illustrated in FIG. 14, the processor converts the arithmetic instruction in line 25 to SIMD assembly code similarly to the SIMD conversion of arithmetic instruction in line 18. Namely, as has been described with reference to FIG. 18, the processor deletes, with respect to the arithmetic instruction in line 25, the references to the sizes of dynamic spaces of other processes and comparisons between the size of the other processes and the local process size in steps S181 to S183. Further, the processor converts the step (6) of copying coarray component from process 1 indicated in FIG. 18 to SIMD assembly code that does not include comparisons between the sizes and numbers of iterations, similarly to the one illustrated in FIG. 16.

Figure 13:
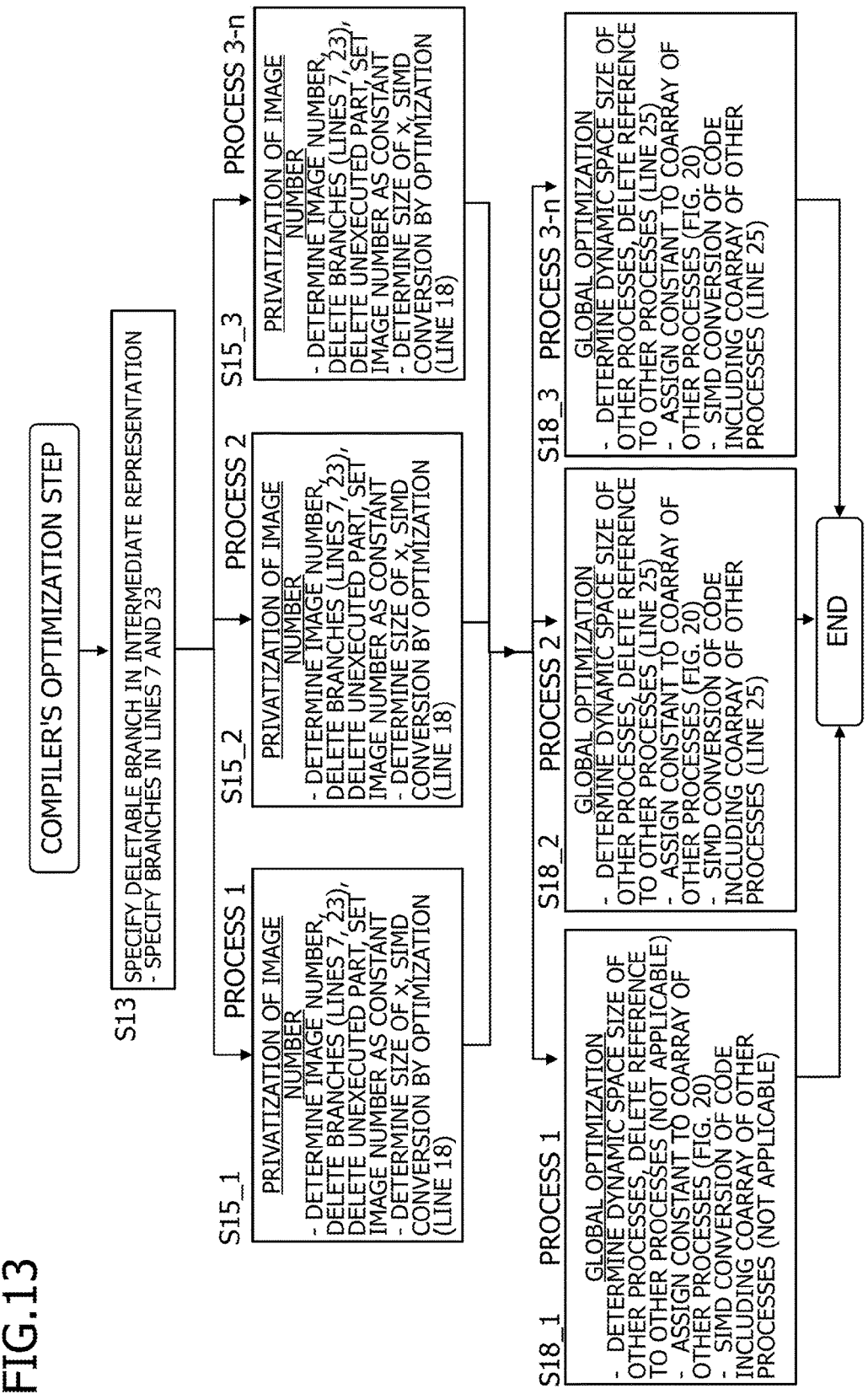
FIG. 13 is a diagram depicting an overall flowchart of the compiler's optimization process that is a combination of FIGS. 9, 11, and 12 combined based on FIG. 8.

FIG. 13 is a diagram depicting an overall flowchart of the compiler's optimization process that is a combination of FIGS. 9, 11, and 12 combined based on FIG. 8. FIG. 13 indicates line numbers of programs that are the target of the optimization process described in the foregoing. The already explained overall optimization are reviewed again by referring to FIG. 13 as follows.

Namely, the compiler's optimization process includes the step S13 (FIG. 9) of specifying deletable branch instructions, the step of privatizing image numbers S15 (first optimization step, FIG. 11), and the global optimization step S18 (second optimization step, FIG. 12). The step S13 of specifying deletable branch instructions is executed to the intermediate representation program common to all processes, while the step S15 of privatizing image numbers and the global optimization step S18 are executed to each of the optimization target programs of all the processes.

In the step of privatizing image numbers S15, since the local image number is the process number in the optimization target program of each process, the processor assigns this process number to the functions indicative of image numbers, deletes branch instructions whose conditional statements are constants, and deletes code that is not to be executed. In this step, the branch instructions in lines 7 and 23 of the source program are deleted, and code that is not to be executed is deleted (see FIG. 14). The code that is not to be executed differs depending on the process (i.e., image). The ordinary optimization and SIMD conversion that are executed in the step of privatizing image numbers convert the arithmetic instruction in line 18 to SIMD (see FIG. 16). Since the size of component x with ALLOCATABLE attributes differs depending on the process (i.e., image), the number of arithmetic instructions converted to SIMD differs, too. However, the number of arithmetic instructions can be determined because the image numbers can be replaced with the process number, and thus the comparison instructions for comparing sizes of component x and numbers of SIMD iterations are not necessary in the program after SIMD conversion.

In the step S15 of privatizing image numbers described above, as a result of the image number in the optimization target program of each process being privatized with corresponding process numbers, the sizes of dynamic spaces of other processes and coarray values of other processes have already been determined. Therefore, in the next global optimization step S18, the processor converts the references to dynamic space sizes of other processes, and references to coarray values of other processes in the optimization target program to respective values.

The target of the former task (for dynamic space size) is the arithmetic instruction in line 25 of processes 2 and 3 to n. As indicated in FIG. 14, the arithmetic instruction in line 25 has been deleted from the program of process 1 since it is a code not to be executed. The example of the target of the latter task (for coarry values) is as has been illustrated in FIG. 19.

Further ordinary optimization and SIMD conversion executed in the global optimization step S18 convert the arithmetic instruction in line 25 to SIMD assembly code.

Next, an explanation will be made of the step S13 of specifying deletable branch instructions being executable within the step S15 of privatizing image numbers in each process. In the step S13 of specifying deletable branch instructions, as has been described, the processor substitutes functions and variables indicative of image numbers with given constants, performs constant propagation, and extracts a branch instruction whose conditional statement is a constant, for the intermediate representation program common to processes. Note, in the step S15 of privatizing image numbers, too, the processor substitutes functions and variables indicative of image numbers with corresponding image numbers (process numbers), performs constant propagation, and checks if the conditional statement is true or false (S153) for the optimization target program of each process. Therefore, the step S13 of specifying deletable branch instructions may each be executed in the step of privatizing image numbers S15 of each process. It is desirable, however, to perform the step S13 of specifying deletable branch instructions for the intermediate representation program that is common to the processes, since all the branch instructions need to be checked in all the processes, if the step S13 is executed in the step 15 in each process.

Figure 20:
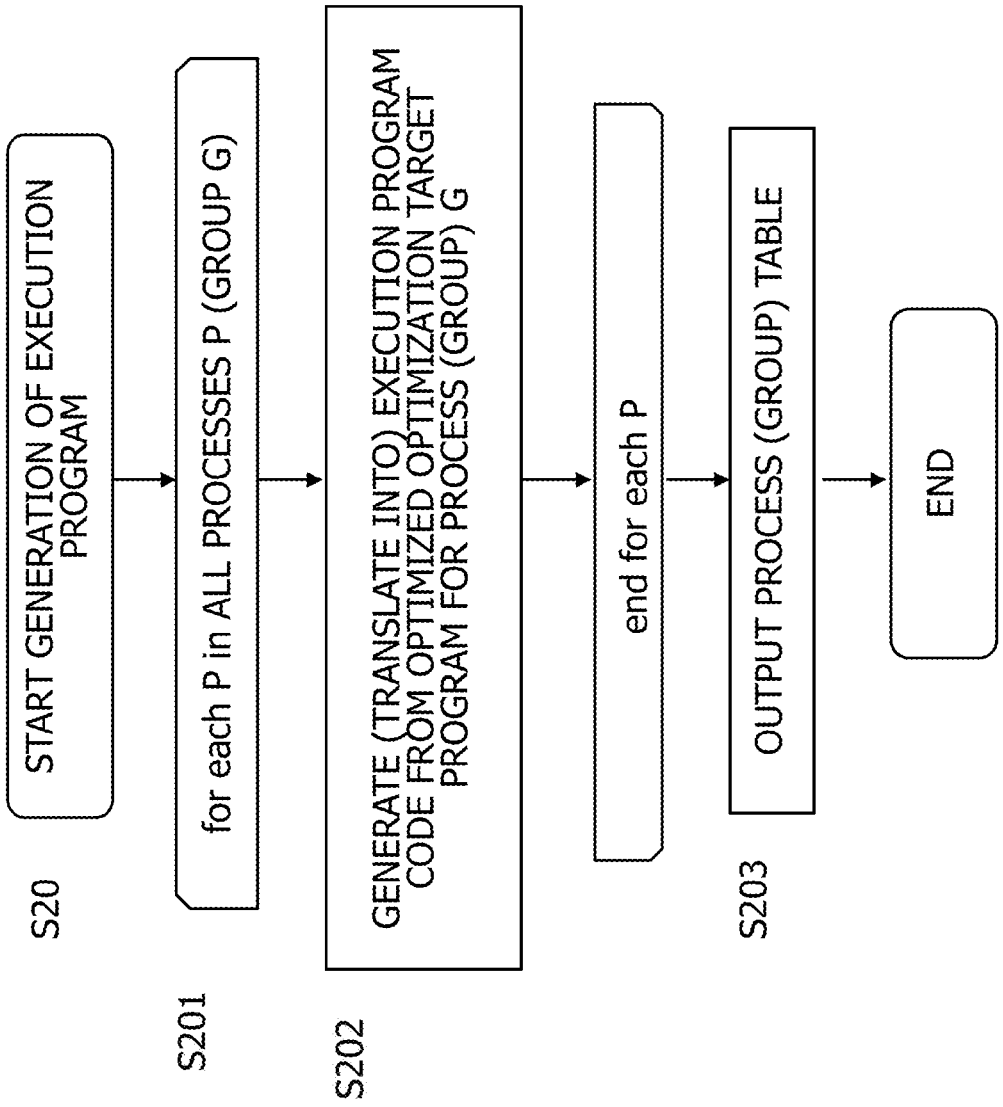
FIG. 20 is a diagram depicting a flowchart of the step of generating the execution program of FIG. 8.

FIG. 20 is a diagram depicting a flowchart of the step of generating the execution program of FIG. 8. Step S20 of generating the source language code in FIG. 8 is, in this embodiment, the step of converting (translating) an optimization target intermediate representation program optimized for each process to an execution program. The execution program is, for example, an object code translated to a machine language.

In the execution program generating step, the processor repeats (S202), for all the processes (S201), generating (translating into) an execution program from an optimization target intermediate representation program after optimization of each process (partly converted to assembly code). When a plurality of processes are grouped as described later, the processor generates an execution program (S202) for the group of all processes (S201). The processor further outputs a table of process group that is a table of correspondence between process groups and process numbers belonging thereto. The table of process group is generated when processes are grouped, and referred to when the execution program to be described later is loaded to each process.

Figure 21:
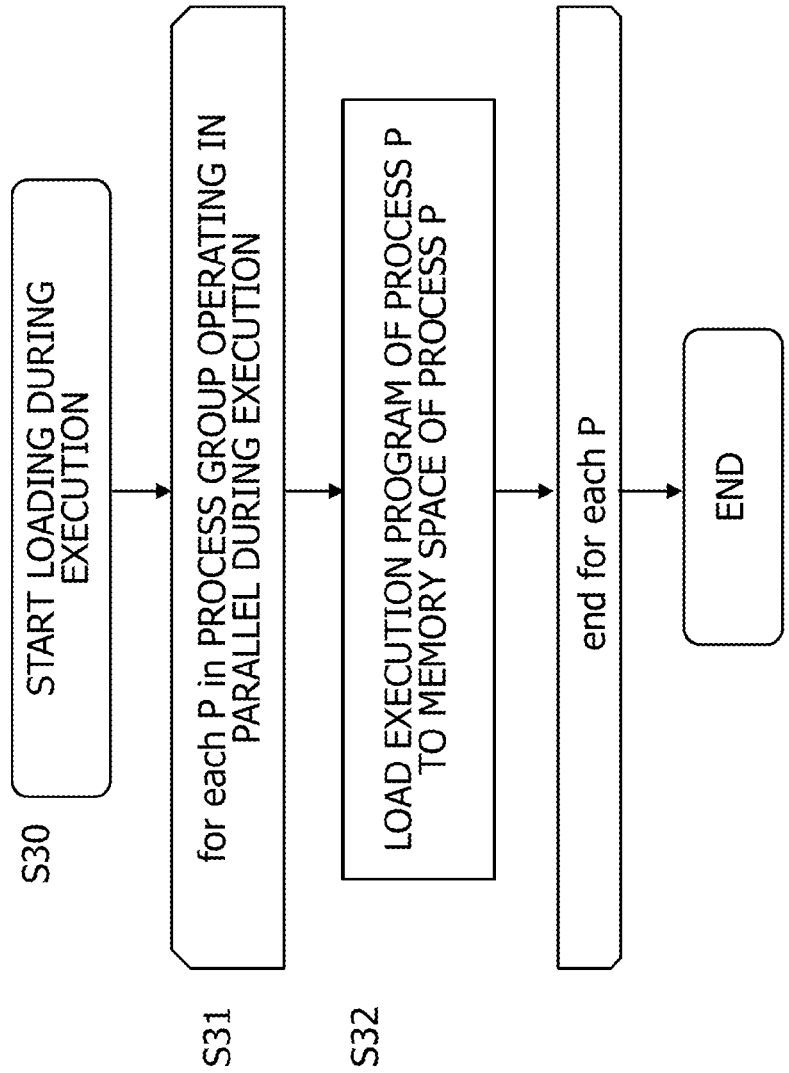
FIG. 21 is a diagram depicting a flowchart of the execution program loading step that is performed when executing the process-parallel program.

FIG. 21 is a diagram depicting a flowchart of the execution program loading step that is performed when executing the process-parallel program. In the loading step, the processor loads (S32), for all the plurality of processes operating in parallel (S31), the execution program of each process to the memory space of the process. During execution, the number of processes is set based on the architecture of the executing computer. Therefore, as illustrated in FIG. 7, the processor loads an execution program of each process for each of the set number n of processes. The plurality of processes of the executing computer then executes their execution programs.

The execution program loading step may be realized by a load program contained in the compiler as one functionality thereof. In this case, the processor that executes the compiler loads the execution programs to the memory spaces of the processes of the executing computer, and the executing computer executes the programs in parallel. Alternatively, the load program of the execution program may be attached to the execution program of all the processes. In this case, the executing computer loads the attached load program to the memory space of each process and executes it.

Figure 22:
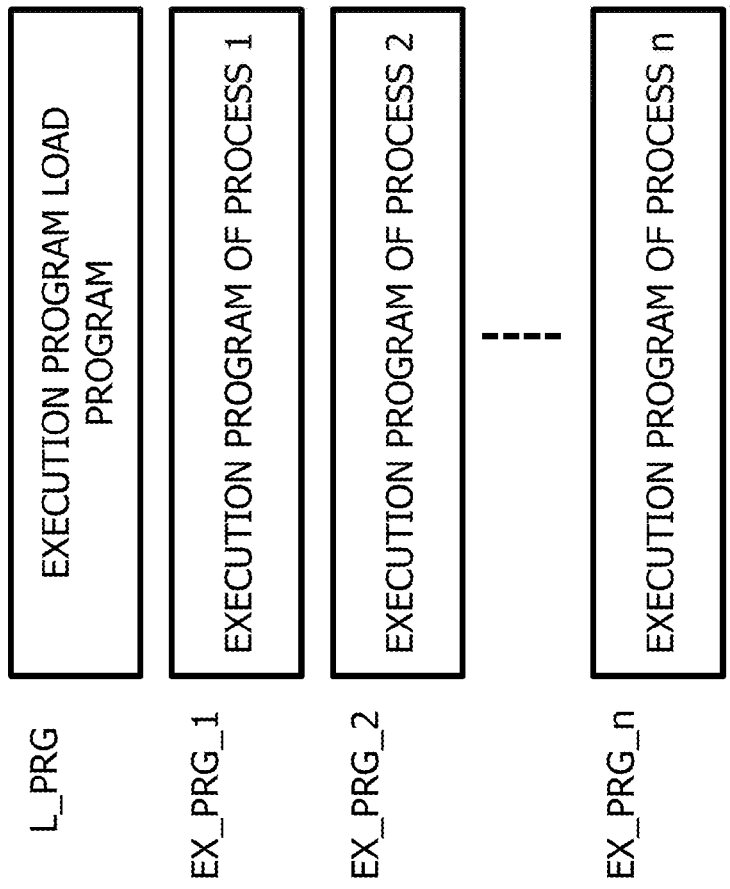
FIG. 22 is a diagram illustrating a group of execution programs to which a load program is attached.

FIG. 22 is a diagram illustrating a group of execution programs to which a load program is attached. Load program L_PRG that performs the execution program loading step is attached to respective execution programs EX_PRG_1 to n of the plurality of processes 1 to n. The executing computer executes the load program to load the execution program to each process, so that each process of the executing computer executes its execution program.

As described above, in the first embodiment, the processor that executes the compiler copies an intermediate representation program converted from a source program to generate optimization target intermediate representation programs for each of all the processes, and executes, for each of the optimization target intermediate representation programs, a first optimization step (optimization by the step of privatizing image numbers where local image numbers are privatized), and a second optimization step (optimization by the global optimization step where information of other processes is converted to constants). This way, optimization efficiency can be better enhanced than through optimization of a source program written in a parallel programming language.

Second Embodiment

In the first embodiment, the processor that executes the compiler generates an optimization target program for each of all the processes, and performs optimization steps such as privatization of image numbers to translate them to respective execution programs. When the number of processes is large, however, large-capacity memory resources are needed for storing the optimization target programs and execution programs of all the processes, and time and the number of steps for the optimization are increased, too.

In the second embodiment, therefore, the processor that executes the compiler groups a plurality of processes having the same value for the conditional statement of deletable branch instructions, generates an optimization target program for each process group, and performs the first and second optimization steps to the optimization target programs of the process groups.

Figure 23:
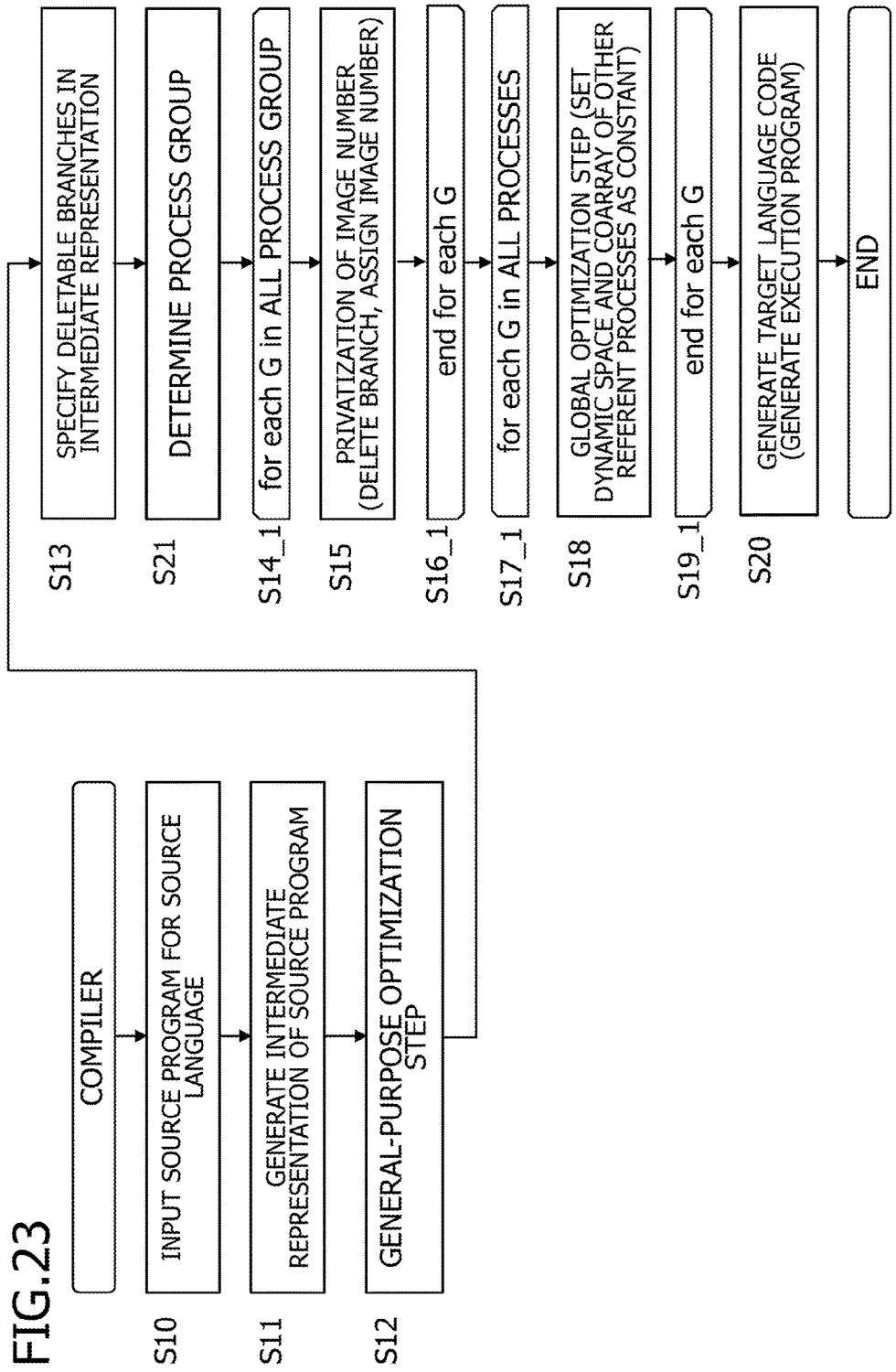
FIG. 23 is a diagram depicting a flowchart of the compiler's process steps in the second embodiment.

FIG. 23 is a diagram depicting a flowchart of the compiler's procedure steps in the second embodiment. The steps different from those of the flowchart of the first embodiment illustrated in FIG. 8 are: step S21 of determining process groups, and repeatedly executing (S14_1, S16_1, S17_1, and S19_1) the step S15 of privatizing image numbers and the global optimization step S18 for all the process groups. Other steps are the same as those of the first embodiment.

Figure 24:
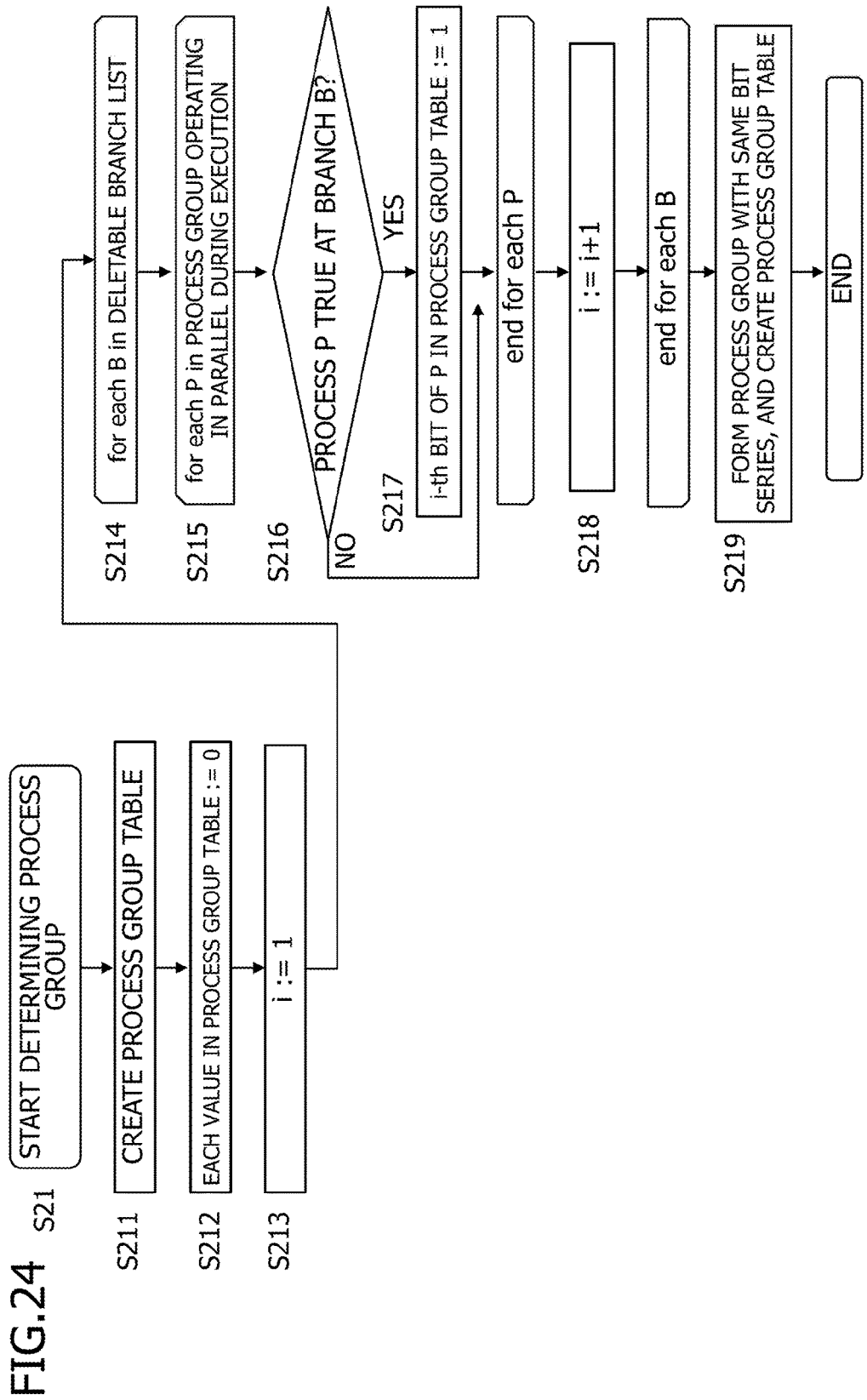
FIG. 24 is a diagram depicting a flowchart of the step of determining process groups.

FIG. 24 is a diagram depicting a flowchart of the step of determining process groups. The processor that executes the compiler first creates a table of process groups (S212).

Figure 25:
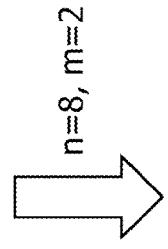
FIG. 25 is a diagram illustrating an example of a table of process groups.

FIG. 25 is a diagram illustrating an example of a table of process groups. In the table of process groups PG_T_0 in the initial state, bit string having m bits that is equal to the number of deletable branch instructions are assigned to each of the elements of process numbers 1 to n. Normally, process numbers are set when the program is executed. Therefore, the process number n in the process group table is a maximum process number settable at the time of execution.

It is assumed that the maximum settable process number n is 8 (n=8). The number m of deletable branch instructions extracted from the source program of FIG. 2 is 2 (m=2). Therefore, in the following example, in the table of process groups PG_T, 02-bit string is assigned to each element of process numbers 1 to 8. The initial value of the bit string is, for example, 0 for all the processes (or it may be 1).

Referring back to FIG. 24, the processor initializes the bit position i indicative of the position of the bit strings to 1, i.e., i=1 (S213), and repeats the following steps for each of all the branch instructions on the deletable branch list (S214). In the following steps, for each of all the processes in a process group that operate in parallel during execution (S215), the processor repeats assigning a target process number to functions and variables indicative of image numbers, performing constant propagation, checking the branch instructions in each process to determine whether the conditional statement is true or false (S216), and changing the i-th bit of the bit string to "1" (S217) if it is true. Thus, the bit position i of the bit string of the elements of processes 1 to 8 is determined to be 1.

When the iterations of steps S215 to S217 are complete for all the processes, the processor increments the bit position i by 1 (i=i+1) (S218), and repeats the above-mentioned steps S215 to S217 to the next deletable branch instruction for all the processes. When these steps are repeated by the number of deletable branch instructions, the process group table PG_T of FIG. 25 is generated. In this table, the value of 2-bit string in the elements of processes 1 to 8 is changed to "1" through steps S216 and S217 when the conditional statement of the branch instruction is true.

For example, the conditional statement of the branch instruction in line 7 is true in process 2, while it is false in other processes 1 and 3 to n. The conditional statement of the branch instruction in line 23 is false in process 1, while it is true in other processes 2 to n. Therefore, the bit string in process 1 is 00, the bit strings in process 2 is 11, and the bit string in processes 3 to n is 01.

Further, the processor forms groups of processes that have same bit string, and creates a process group table that indicates correspondence between process numbers belonging to respective process groups and respective process group numbers (S219). The bit strings serve as identification numbers of respective process groups. In the above example, only process 1 belongs to process group 00 (PG_00), only process 2 belongs to process group 11 (PG_11), and processes 3 to 8 belong to process group 01 (PG_01). This is the process group table.

As illustrated in FIG. 23, the processor repeats the step of privatizing image numbers S15 for each of all the process groups, creates optimization target program for each process group (S15, S151 in FIG. 11), and deletes deletable branch instructions and code that is not to be executed when branched (S15, S153 to S155 in FIG. 11). The branch directions of branch instructions are determined by referring to bit strings of the process group table. Alternatively, the branch directions may be determined by setting a certain process number within a process group to a function indicative of the process and by performing constant propagation. The processor then performs the step of converting image number to constant (S15, S157 in FIG. 11) when the process group has one process that belongs thereto. When the process group has a plurality of processes belonging thereto, each process number is determined when each process executes the execution program.

Further, the processor repeats the global optimization step S18 for each of all the process groups. Branch instructions having different branch directions depending on image numbers have been deleted by the step of privatizing image numbers from the optimization target program of each process group. Therefore, by referring to the optimization target program of the process group to which the referring destination process belongs, the size of the dynamic space in referring destination process can be known. Similarly, the coarray value of the referring destination process can be known. Thus the global optimization step can be executed for each of the process groups.

As described above, in the second embodiment, the processor that executes the compiler optimizes the optimization target program generated for each process group. In the case with the example of FIG. 14, only one optimization target program is generated which is common to images 3 to n.

The execution program generating step in the second embodiment is the same as the flowchart of FIG. 20. As illustrated in FIG. 20, the processor translates the optimized optimization target programs of each of all the process groups into execution programs. Thus execution programs are generated per process group. The processor then outputs the process group table (S203).

Figure 26:
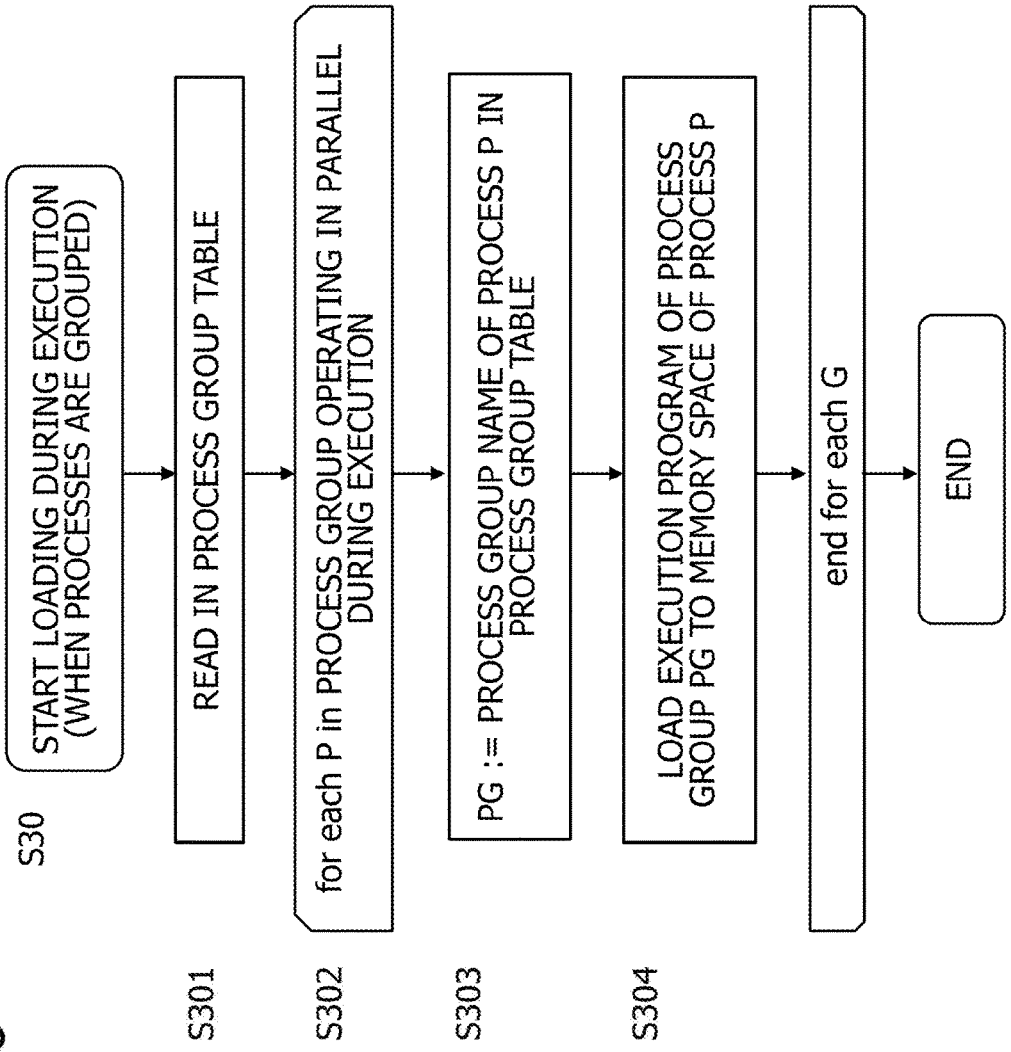
FIG. 26 is a diagram depicting a flowchart of the loading step during execution in the second embodiment.

FIG. 26 is a diagram depicting a flowchart of the loading step during execution in the second embodiment. The processor first reads in the process group table (S301). For each of the processes in a process group that operate in parallel (S302), the processor repeats the steps of referring to the process group table and reading in process group name PG of a target process P (S303), and loading the execution program of the read process group PG to the memory space of process P (S304). As a result, execution programs are loaded to the memory spaces of all the processes P.

Figure 27:
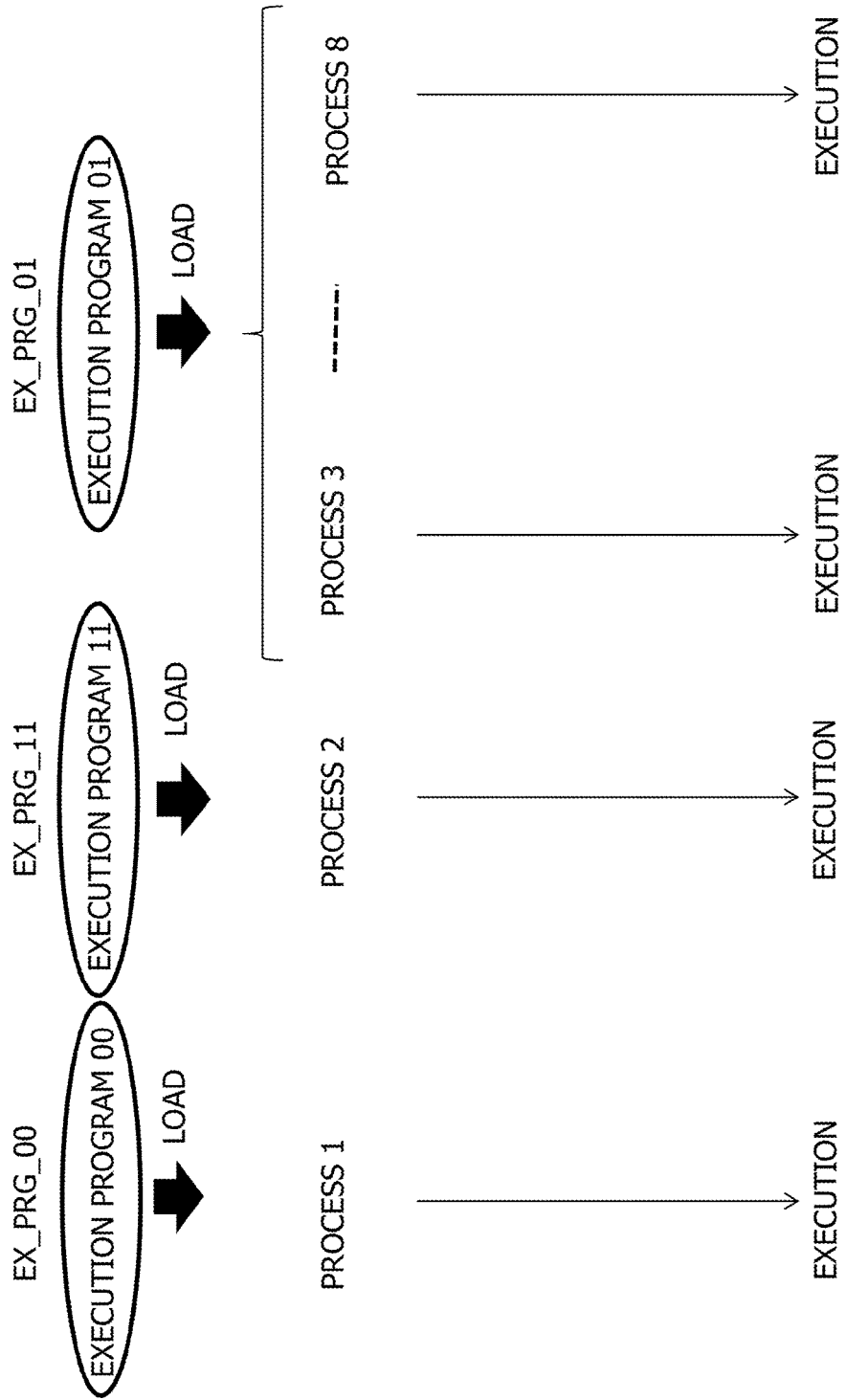
FIG. 27 is a diagram illustrating loading and execution of the execution programs in the second embodiment.

FIG. 27 is a diagram illustrating loading and execution of the execution programs in the second embodiment. The processor loads execution program EX_PRG_00 to the memory space of process 1, loads execution program EX_PRG_11 to the memory space of process 2, and execution program EX_PRG_01 of process group 01 to which processes 3 to 8 belong to the respective memory spaces of processes 3 to 8. The loaded execution programs are each executed in each process.

As described above, according to the second embodiment, processes having deletable branch instructions with the same branch direction are classified in the same process group, and the processor executes the compiler to execute optimization and translation into execution programs for the optimization target programs of each process group. Therefore, the number of optimization target programs during compilation can be reduced, which enables the memory space to be reduced. Compile time can also be shortened.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable storage medium storing therein a compiler program for causing a computer to execute a procedure comprising:

copying a source program written in a parallel programming language to generate a plurality of optimization target programs corresponding to a plurality of image numbers respectively, each of the plurality of image numbers including each number of processes that are executed in parallel when the source program is executed; and repeatedly performing, for each of the plurality of optimization target programs, a first optimization that includes, substituting a function or a variable that indicates one of the plurality of image numbers in the each of the plurality of optimization target programs with the one of the plurality of image numbers, performing a constant propagation in the each of the plurality of optimization target programs, deleting a conditional branch instruction having a condition under which a conditional statement is changed to a constant due to the constant propagation, and deleting a code that is not to be executed based on the conditional branch instruction.

2. The non-transitory computer-readable storage medium according to claim 1, the procedure further comprising:

repeatedly performing, for each of the plurality of optimization target programs, a second optimization that includes setting, to an instruction that contains a referring to a predetermined information depending on the image number in other process, a constant of the predetermined information.

3. The non-transitory computer-readable storage medium according to claim 1, the procedure further comprising: prior to repeating the first optimization, substituting the function or variable that indicates the one of the plurality of image numbers in the source program with any constant value, performing a constant propagation in the source program, and extracting conditional branch instructions having a condition under which a conditional statement is changed to a constant due to the constant propagation, as deletable branch instructions, wherein the first optimization is executed for each of the deletable branch instructions.

4. The non-transitory computer-readable storage medium according to claim 3, the procedure further comprising: after extracting the deletable branch instructions and prior to generating the optimization target programs, grouping the plurality of image numbers in the source program to a same process group, the plurality of image numbers having results of determination of the conditional statement of the deletable branch instructions conforming to each other, wherein the generating the optimization target programs includes generating a common optimization target program for the grouped plurality of image numbers.

5. The non-transitory computer-readable storage medium according to claim 4, wherein the copying the source program written in a parallel programming language to generate the optimization target programs and the first optimization are executed for each of the process groups, and the substituting in the first optimization is executed for the optimization target program of the process groups that includes a single image number.

6. The non-transitory computer-readable storage medium according to claim 1, wherein the first optimization further includes an optimization including a constant propagation and converting repeated tasks to SIMD when SIMD conversion is possible, after deletion of the conditional branch instruction.

7. The non-transitory computer-readable storage medium according to claim 2, wherein the predetermined information is a size of a dynamic space of the other process that is referred to, and the second optimization includes setting the constant to the size when the size of the dynamic space is a constant.

8. The non-transitory computer-readable storage medium according to claim 2, wherein the predetermined information is a coarray value of the other process that is referred to, and the second optimization includes setting the constant to the coarray value when the coarray value is a constant.

9. The non-transitory computer-readable storage medium according to claim 2, wherein the second optimization includes, after setting the constant, performing an optimization including a constant propagation and converting repeated tasks to SIMD when SIMD conversion is possible.

10. The non-transitory computer-readable storage medium according to claim 1, the procedure further comprising:

converting the plurality of optimization target programs that are generated for the plurality of image numbers respectively to a plurality of execution programs respectively.

11. The non-transitory computer-readable storage medium according to claim 10, the procedure further comprising:

loading each of the plurality of execution programs to each of memory spaces of processes corresponding to the plurality of image numbers.

12. The non-transitory computer-readable storage medium according to claim 1, the procedure further comprising:

loading a plurality of execution programs generated for each of the plurality of image numbers to each of processes corresponding to the plurality of image numbers.

13. A method of compiling comprising:

copying a source program written in a parallel programming language to generate a plurality of optimization target programs corresponding to a plurality of image numbers respectively, each of the plurality of image numbers including each number of processes that are executed in parallel when the source program is executed; and repeatedly performing, for each of the plurality of optimization target programs, a first optimization that includes, substituting a function or a variable that indicates one of the plurality of image numbers in the each of the plurality of optimization target programs with the one of the plurality of image numbers, performing a constant propagation in the each of the plurality of optimization target programs, deleting a conditional branch instruction having a condition under which a conditional statement is changed to a constant due to the constant propagation, and deleting a code that is not to be executed based on the conditional branch instruction.

14. A compile device comprising:

a memory; and a processor that is connected to the memory, wherein the processor executes a procedure that includes, copying a source program written in a parallel programming language to generate a plurality of optimization target programs corresponding to a plurality of image numbers respectively, each of the plurality of image numbers including each number of processes that are executed in parallel when the source program is executed; and repeatedly performing, for each of the plurality of optimization target programs, a first optimization that includes, substituting a function or a variable that indicates one of the plurality of image numbers in the each of the plurality of optimization target programs with the one of the plurality of image numbers, performing a constant propagation in the each of the plurality of optimization target programs, deleting a conditional branch instruction having a condition under which a conditional statement is changed to a constant due to the constant propagation, and deleting a code that is not to be executed based on the conditional branch instruction.

* * * * *